US007546857B2

(12) United States Patent
Chadbourne et al.

(10) Patent No.: US 7,546,857 B2
(45) Date of Patent: Jun. 16, 2009

(54) CONNECT/DISCONNECT COUPLING FOR A CONTAINER

(75) Inventors: Richard Chadbourne, Eagan, MN (US); Thomas Anthony Braun, Minneapolis, MN (US); Charles Peter deCler, Stillwater, MN (US); Brian J. Blenkush, Maple Grove, MN (US)

(73) Assignee: Colder Products Company, St. Paul, MN (US)

(*) Notice: Subject to any disclaimer, the term of this patent is extended or adjusted under 35 U.S.C. 154(b) by 432 days.

(21) Appl. No.: 11/095,125

(22) Filed: Mar. 30, 2005

(65) Prior Publication Data

US 2005/0247371 A1 Nov. 10, 2005

Related U.S. Application Data

(60) Provisional application No. 60/569,308, filed on May 6, 2004.

(51) Int. Cl.
*B65B 1/04* (2006.01)
*F16L 37/28* (2006.01)
*F16L 37/32* (2006.01)

(52) U.S. Cl. ....................... 141/354; 141/351; 141/352; 141/353; 251/149.6; 137/614.04

(58) Field of Classification Search ..................... 141/2, 141/18, 346, 351–356; 137/588, 614.04; 251/149.6
See application file for complete search history.

(56) References Cited

U.S. PATENT DOCUMENTS

| | | | |
|---|---|---|---|
| 2,273,083 | A | 2/1942 | Angel |
| 3,563,266 | A | 2/1971 | Berry |
| D248,545 | S | 7/1978 | Summers |
| 4,195,750 | A | 4/1980 | Fee |
| 4,235,267 | A | 11/1980 | Brake et al. |
| 4,436,125 | A | 3/1984 | Blenkush |
| 4,588,103 | A | 5/1986 | Baughman |
| 4,785,963 | A | 11/1988 | Magley |
| 5,082,244 | A | 1/1992 | Krier et al. |
| 5,108,015 | A | 4/1992 | Rauworth et al. |
| 5,237,083 | A | 8/1993 | Martino et al. |
| 5,273,083 | A | 12/1993 | Burrows |
| 5,316,041 | A | 5/1994 | Ramacier, Jr. et al. |

(Continued)

FOREIGN PATENT DOCUMENTS

| | | |
|---|---|---|
| WO | WO 95/00435 | 1/1995 |

(Continued)

OTHER PUBLICATIONS

International Search Report and Written Opinion mailed Feb. 11, 2008.

*Primary Examiner*—Timothy L Maust
(74) *Attorney, Agent, or Firm*—Merchant & Gould P.C.

(57) ABSTRACT

A container insert having at least two primary pieces, wherein one of the pieces includes keying features that may be replaceable with other pieces having different keying features. A related single piece container insert includes multiple keying features formed on the interior and exterior surfaces of the container insert. A related coupling assembly includes a venting system that vents a fluid into the container after a valve in the coupling assembly, which is positioned in the container contents flow path, has been opened.

18 Claims, 27 Drawing Sheets

U.S. PATENT DOCUMENTS

| | | | |
|---|---|---|---|
| 5,445,186 | A | 8/1995 | Richter et al. |
| 5,467,806 | A | 11/1995 | Stricklin et al. |
| 5,494,074 | A | 2/1996 | Ramacier, Jr. et al. |
| 5,511,692 | A | 4/1996 | Willingham |
| 5,609,195 | A | 3/1997 | Stricklin et al. |
| 5,639,064 | A | 6/1997 | deCler et al. |
| 5,641,012 | A | 6/1997 | Silversides |
| 5,680,953 | A | 10/1997 | Baughman |
| 5,709,244 | A | 1/1998 | Patriquin et al. |
| 5,758,700 | A | 6/1998 | Vanderploeg |
| 5,816,298 | A | 10/1998 | Stricklin et al. |
| 5,839,488 | A | 11/1998 | Peters |
| 5,884,648 | A | 3/1999 | Savage |
| 5,901,761 | A | 5/1999 | Rutter et al. |
| 5,937,920 | A | 8/1999 | Simmel et al. |
| 5,960,840 | A | 10/1999 | Simmel et al. |
| 5,971,189 | A | 10/1999 | Baughman |
| 5,975,164 | A | 11/1999 | Whaley et al. |
| 5,983,964 | A | 11/1999 | Zielinksi et al. |
| 5,996,653 | A | 12/1999 | Piccinino, Jr. |
| 6,007,107 | A | 12/1999 | Kazarian |
| 6,045,000 | A | 4/2000 | Rauworth et al. |
| 6,070,624 | A | 6/2000 | Bilbrey et al. |
| 6,079,444 | A | 6/2000 | Harris et al. |
| 6,079,597 | A | 6/2000 | Rauworth et al. |
| 6,149,129 | A | 11/2000 | Harris et al. |
| 6,170,543 | B1 | 1/2001 | Simmel et al. |
| 6,202,717 | B1 | 3/2001 | Markey et al. |
| 6,223,791 | B1 | 5/2001 | Arsenault et al. |
| 6,234,450 | B1 | 5/2001 | Jeory |
| 6,325,100 | B1 | 12/2001 | Bunschoten et al. |
| 6,325,115 | B1 | 12/2001 | Cowland et al. |
| 6,347,785 | B1 | 2/2002 | Copp et al. |
| 6,360,908 | B1 | 3/2002 | Kline |
| 6,378,742 | B1 | 4/2002 | Rohr et al. |
| 6,390,156 | B1 | 5/2002 | Hetherington et al. |
| 6,425,502 | B1 | 7/2002 | Rauworth et al. |
| 6,463,957 | B1 | 10/2002 | Ozawa |
| 6,471,082 | B1 | 10/2002 | Fritzinger |
| 6,478,058 | B1 | 11/2002 | Pears |
| 6,497,260 | B2 | 12/2002 | Hennan et al. |
| 6,499,719 | B1 | 12/2002 | Clancy et al. |
| 6,516,839 | B1 | 2/2003 | Timp et al. |
| 6,561,386 | B1 | 5/2003 | Martens |
| 6,568,427 | B2 | 5/2003 | Imai |
| RE38,204 | E | 7/2003 | Kazarian |
| 6,612,545 | B1 | 9/2003 | Rutter et al. |
| 6,637,725 | B2 | 10/2003 | Davis et al. |
| 6,644,340 | B2 | 11/2003 | Rokkjaer |
| 6,644,367 | B1 | 11/2003 | Savage et al. |
| 6,644,510 | B2 | 11/2003 | Kawolics et al. |
| 6,648,182 | B2 | 11/2003 | Rauworth et al. |
| 6,669,062 | B1 | 12/2003 | Laible |
| 6,722,519 | B2 | 4/2004 | Baughman |
| 2001/0008152 | A1 | 7/2001 | Arsenault et al. |
| 2001/0052366 | A1 | 12/2001 | Ozawa |
| 2002/0040740 | A1 | 4/2002 | Ozawa |
| 2002/0104980 | A1 | 8/2002 | Jainek |
| 2002/0153057 | A1 | 10/2002 | Nagel |
| 2002/0179157 | A1 | 12/2002 | Rokkjaer |
| 2003/0010387 | A1 | 1/2003 | Rauworth et al. |
| 2003/0106610 | A1 | 6/2003 | Roos et al. |
| 2003/0182662 | A1 | 9/2003 | Nishio et al. |
| 2003/0188800 | A1 | 10/2003 | Woodruff |
| 2004/0016899 | A1 | 1/2004 | Clancy et al. |
| 2008/0011785 | A1 | 1/2008 | Braun et al. |

FOREIGN PATENT DOCUMENTS

| | | | |
|---|---|---|---|
| WO | WO 01/66458 | A2 | 9/2001 |
| WO | WO 2005/108280 | A2 | 11/2005 |
| WO | WO 2006/110541 | A2 | 10/2006 |

CONNECT/DISCONNECT COUPLING FOR A CONTAINER

CROSS REFERENCE TO RELATED APPLICATIONS

This application claims priority to U.S. Provisional Patent Application Ser. No. 60/569,308 filed on May 6, 2004, and entitled CONNECT/DISCONNECT COUPLING FOR A CONTAINER, which application is incorporated herein by reference.

BACKGROUND OF THE INVENTION

1. Field of the Invention

The present invention generally relates to connect/disconnect couplings and coupling valve assemblies, and more particularly relates to quick connect/disconnect couplings for use with containers.

2. Related Art

A variety of industries use pails, drums, and larger Intermediate Bulk Containers ("IBC's" or "Totes") for the delivery of liquid chemical media. These containers typically have a variety of closure sizes and styles depending on the size and type of container. Some common closure types are threaded bung openings, snap-in, and crimp-in closures. Some example threaded bung openings include 2" buttress female and 2" NPS female (commonly used in 30 gal, 55 gal, and larger drums and IBC's), 63 mm male (commonly used in 5 gal jerry cans), and European Mauser. One example snap-in or crimp-in closure is the FLEXSPOUT® made by Rick Connection Systems of Auburn, Ind.

There are a billion or more rigid containers and countless other types of semi-rigid and flexible containers produced each year around the world. In order to extract the contents of a container, most containers are simply tipped over so that the contents inside are emptied through one of the openings of the container or a simple valve inserted into the opening. Other containers have an opening in the bottom (typically the larger IBC's) that allow for a bottom dispense through a simple hand valve.

A smaller percentage of the containers are emptied of their contents while the container remains upright using a top feed device such as a hand operated pump or a motor driven mechanical positive displacement pump that draws the contents out of the container via a dip-tube. Most of these containers are intended to be low cost "one way" containers (i.e., the containers are filled once and never seen again by the original filler). The containers may be refilled again by secondary fillers typically up to a maximum of 5 refills before the containers are destroyed or recycled.

An example life cycle of a container is shown with reference to FIG. 28. At step A, the pre-cleaned or in-housed cleaned containers are received. In step B, the containers are clean room chemical filled and certified, and fitted with dust caps. In step C, the containers are shipped as a dedicated container to the same user. In step D, the dust cap is torn away and the user certifies the contents by checking extractables and/or particles levels, and the dispense head is installed. In step E, the container contents are extracted, the dispense head is removed, and new dust caps are installed for the return trip. In step F, the empty container is shipped to a supplier. In step G, the clean container is returned to step B for filling. In step H, a dirty container is returned to step A for cleaning.

The basic system requirements for a dispense system for a container can be characterized by the following four factors: closed or open systems, reusable or disposable systems, industrial (low-purity) grade or high grade (ultra-pure) chemical systems, and DOT/UN approved or unapproved systems.

Closed systems are designed to prevent exposure of a user to the contents of the container at any phase of the connection cycle (disconnected phase, connecting/disconnecting phase, and connected dispensing phase). Open systems have at least the following two design possibilities: 1) a system that allows the user to be exposed to the container contents (either liquid or vapors) when the connect/disconnect system is being connected or disconnected and/or when the system is in the connected/dispense phase, and 2) a system that allows air to enter the container when product is withdrawn or allows vapors to escape when the system is in the connected/dispensing phase.

Reusable systems typically include a dip tube that is intended to be used for many (100+) connection cycles. A reusable system may have to be removed several times from the container during its life to allow for cleaning. Disposable systems typically include a dip tube that is intended to be used less than five connection cycles and then thrown away. Disposable systems may be inserted into the container once with the intent of being disposed of along with the container.

Industrial (low-purity) grade (IPG) chemical systems make up about 80% of all chemicals supplied. Chemicals that fall under this category include those chemicals wherein the purity of the chemical is suitable for common chemical applications such as industrial cleaners, soaps, surfactants, clean-in-place (CIP) chemicals for dairy and food, dry cleaning and laundry, and agricultural pesticides and herbicides as well as other general use applications. IPG's must be delivered in a reasonably clean system but do not require the "super" clean requirements needed for handling Ultra Pure chemicals such as metallic extractability, total organic carbon (TOC), and particle contaminants. High grade (ultra-pure) chemical systems (HPG) applications make up about 20% of all chemicals supplied. Chemicals that fall under this category include chemicals wherein the purity of the chemical must meet criteria for which ultra filtration down to the parts per million (PPM), parts per billion (PPB), or even parts per trillion (PPT) of particles and/or metals is necessary. This classification typically involves such specialized applications as microelectronics, laboratory, and BioPharm industries.

The specific product requirements that differentiate an IPG from an HPG system are primarily related to the materials of construction, handling procedures, and whether the system is "closed" or "open", as described above. As to materials of construction, metals are typically not allowed or desired to come in contact with the container contents. Plastic resins must be very clean and free from metallic contaminants, colorants, etc. These same standards apply for seals that may come into contact with the container contents.

As to handling procedures, the materials must be handled in a way that minimizes the transfer of contaminants to the piece parts or finished goods during production or shipping (e.g., mold release agents are not allowed), regrind plastic resin should not be used in components that have direct contact with the container contents, and lubricants are typically not permitted.

Whether the system is "closed" or "open" is relevant to the extent that Ultra-Pure chemicals often require minimum contact with oxygen. Typically, an inert gas "blanket" is maintained within the container above the container contents vs. allowing air having a high $O_2$ content to enter the container and make up for the container contents that are removed. Typically this blanket gas will be nitrogen, $CO_2$, or other inert gas.

Whether or not a dispense system is Department of Transportation (DOT) and/or United Nations (UN) approved relates to standards for shipping a combined container and closure system. This combination of container and closure system must be approved and certified by the DOT and/or the UN before being transported. Container with closure systems that are used "in house" therefore are required to meet different safety and other standards as opposed to container with closure systems that must be shipped over-the-road.

SUMMARY OF THE INVENTION

In accordance with the present invention, improvements upon existing fluid coupling designs for containers have been made by providing a coupling assembly that provides a quick connect/disconnect function for removing the contents of a container that is relatively cost effective and safe.

One aspect of the invention relates to a container insert having at least two primary pieces, wherein one of the pieces includes keying features that may be replaceable with other pieces having different keying features. Another aspect of the invention relates to a single piece container insert wherein multiple keying features are formed on the interior and exterior surfaces of the container insert. Another aspect of the invention relates to a coupling assembly having a venting system configured to vent a fluid into the container after a valve of the coupling assembly, which is positioned in the container contents flow path, has been opened.

Another aspect of the invention relates to a check valve assembly configured for use at an end of the a dip tube that helps seal the end of the dip tube or alter a pressure condition in the dip tube as the level of container contents lower towards empty. Another aspect of the invention relates to a method of providing a fluid flow path out of a container by coupling a dispense unit to a container insert that has been mounted in an aperture of the container.

The above summary of the present invention is not intended to describe each disclosed embodiment or every implementation of the present invention. Figures in the detailed description that follow more particularly exemplify embodiments of the invention. While certain embodiments will be illustrated and describing embodiments of the invention, the invention is not limited to use in such embodiments.

BRIEF DESCRIPTION OF THE DRAWINGS

Referring now to the drawings in which like reference numbers represent corresponding parts throughout.

Figure 1:
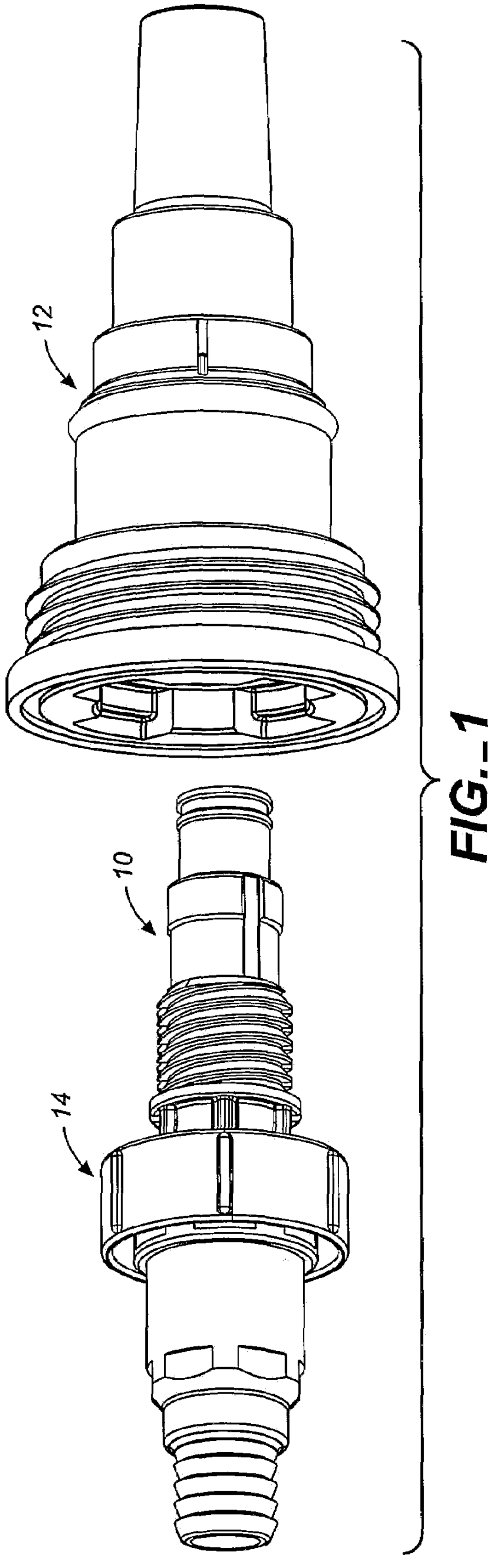
FIG. 1 is a perspective view of an example coupling assembly incorporating principles of the present invention.

While the invention is amenable to various modifications and alternate forms, specifics thereof have been shown by way of example and the drawings, and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

In the following description of the illustrated embodiments, reference is made to the accompanying drawings that form a part hereof, and in which is shown by way of illustration of the embodiments in which the invention may be practiced. It is to be understood that other embodiments may be utilized as structural changes may be made without departing from the spirit and scope of the present invention.

An example coupling assembly 10 is shown and described with reference to FIGS. 1-15. Coupling assembly 10 includes a container insert 12, a dispense unit 14, and a dip tube 16. The container insert 12 and dispense unit 14 are configured for a quick connect/disconnect function relative to each other.

Coupling assembly 10 provides a semi-closed system for dispensing and storing contents in a container. Coupling assembly 10 is not a true closed system in that the dip tube 16 and the container insert 12 may not have a shut-off valve. The coupling system 10 may include a shipping cap 13 (see FIG. 1A) that will seal the dip tube 16 and container insert 12 during shipping. Because there is no separate valve in the dip tube 16 and container insert 12, contents of the container will be exposed to a user outside of the container during the typically brief time when the shipping cap 13 is removed and the dispense unit 14 is not yet connected to the container insert 12.

When in the connected state, the following three general possibilities exist for dealing with the vapors and potential user contact with the container contents while protecting the user from the container contents:

A fully open vent provides air intake into the drum while vapors are allowed to escape through the same opening that the incoming air travels through.

A checked un-ported vent is typically a relatively inexpensive air checking device control that could be incorporated into the container insert or the dispense unit if an objective is to reduce the cost of the container insert. This arrangement would allow venting air into the container but not allow vapors or the container contents out through the vent opening.

A ported vent involves incorporation of an isolated and sealed air vent flow path through the container insert into the dispense unit, which would have an external port. For example, a barb flared (MPT) could be used and would allow the user to have potentially three options for managing the pressure conditions inside the drum as follows: (1) simply vent the vapors to atmosphere, (2) install a one-way check valve into the port that allows air into the drum, but not allow vapors out of the same port (this would provide for a sealed container in the event of a tip over condition), or (3) plumb the vapor flow path to a controlled location such as an air scrubber or filter (this option may provide a method for the end user to apply an inert layer of "blanket gas" to the container contents to prevent oxidation (e.g., nitrogen)).

Of these several options, a fully open vent is potentially the least desirable solution because it is relatively unsafe and does not provide a sealed container, although this option may be the least expensive. A ported vent option may provide the most flexibility and may be the most desirable solution in many circumstances, although it may involve a compromise between flow capacity and expense. A checked unported vent is a somewhat compromised solution between the fully opened vent and the ported vent options. Coupling assembly 10 could include any of these venting options, although the ported vent option is probably the most desirable and is described in further detail below with reference to the Figures.

Coupling assembly 10 is preferably designed and configured so that at least some of the components can be produced at relatively low costs so as to be potentially disposable. Specifically, the container insert 12, dip tube 16, and associated sealing member (not shown) positioned between the container insert 12 and the container may be designed so that the combined cost of these features is such that it is cost effective to dispose of these components, for example, when the container is disposed of or after a limited number of uses.

Coupling assembly 10 may be best suited for industrial pure grade (IPG) applications, although the use of certain materials at an increased cost may make coupling assembly 10 available for use with high purity grade (HPG) chemical systems as well.

Coupling assembly 10 is also preferably designed to be capable of being DOT/UN Certified with a variety of different container sizes. Although the coupling assembly 10 must be approved and certified while in use with a particular container, the coupling assembly 10 by itself includes features that should make it possible to obtain such certification.

While the container insert 12 is preferably a disposable part that only needs to have a life of about, for example, five to ten cycles, it is important that the dispense unit 14 also be a relatively low cost product, although constructed in a way so that it has a far greater life cycle, such as, for example, 1000 or more cycles at a ratio of about 500:1 to the life cycle of the container insert 12.

It is also desirable that the container be compatible with as many chemicals and other container contents as possible while keeping the number of container insert configurations to the lowest number possible so as to minimize potential inventory while maximizing build lots. Two major factors that may influence this objective is the material selection for the container insert 12 and related seals (not shown), and the number of container interfaces. Both polyethylene and polypropylene may be preferred choices for the container insert material because of the very broad chemical compatibility and relatively low cost of these materials. Other materials for construction may include high-density polyethylene (HDPE) or Teflon materials such as PTFE or PFA, although the cost of Teflon materials may be too high for use except for applications related to high purity grade (HPG) chemical systems. One major consideration when choosing materials for the container insert 12 is the DOT/UN Certification requirement that requires testing at 0° F., a temperature at which polypropylene materials often do not perform well. The materials may also be "Fluorinated"; a process that exposes the finished polyethylene part to a Fluorine gas resulting in a part that has typically better chemical resistance than standard polyethylene materials.

The dip tube 16 is made from materials different from those used by the container insert 12 or dispense unit 14. For example, in industrial pure grade (IPG) applications, the dip tube may include some type of "rigid" polytube such as polypropylene, polyethylene, or a soft flexible TYGON® type material. The size of the dip tube is preferably about ⅜ to about ¾ inch outer diameter. For high pure grade (HPG) applications, tubing is preferably made of a rigid type material such as FEP or PFA having dimensions of about ½ to about 1 inch outer diameter with a wall thickness of about 0.06 to 0.07 inches.

If possible, it is preferred that all of the coupling assembly parts are made from a polymer material due to the relatively low cost and high resistance to wear and corrosion of these materials as compared to metals and other materials. This objective is also applied to any springs or other mechanisms that may be required in the coupling assembly 10. In some embodiments, it may be possible to use coated metal materials or metal materials at locations that are not exposed to the container contents. Some example materials for use in the springs include Hastelloy C, 316SS, PPS, PEEK, and PTFE/FEP encapsulated 316SS.

The coupling assembly 10 may be well suited for container applications that involve a "pump sucking" of the container contents from the containers so that the coupling assembly will be exposed to a slight vacuum (about −5 psi maximum). Typically, drum pressure ratings are about 15 psig for plastic materials and 36 psig for metal materials, while some special pressure vessels will be functional within any of these pressure conditions. The couple assembly 10 is also preferably created for use within a temperature range of about −32° to 140° F.

Coupling assembly 10 may be configured with features that reduce fluid spillage upon disconnect of the container insert 12 and the dispense unit 14. Preferably, the fluid spillage at disconnect is minimized to levels less than 0.1 cc/disconnect range if possible.

Coupling assembly 10 is also configured with features that will minimize the turbulence in the flow path through the coupling assembly. Agitation of the pump contents is preferably minimized in order to avoid aeration of the pumped material and the generation of particles and degradation of flow performance. The coupling assembly 10 is also functional without the use of lubricant.

Figure 2:
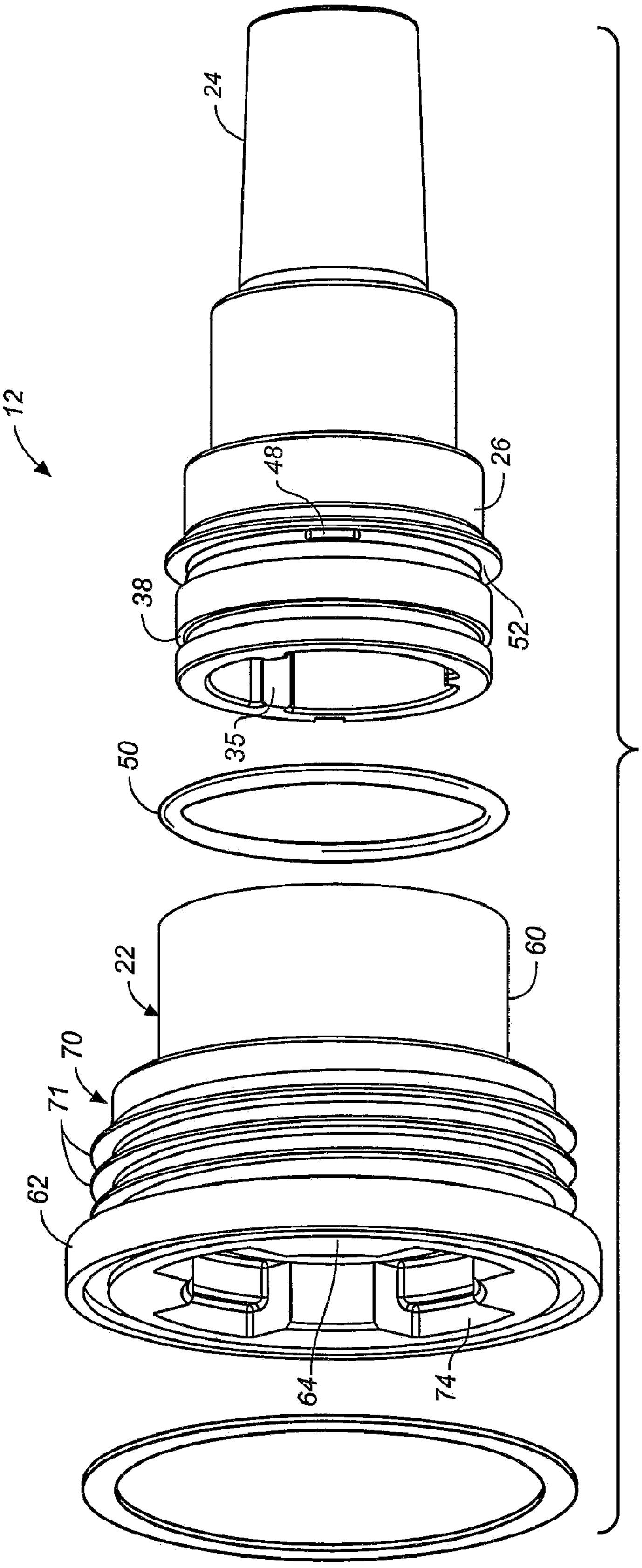
FIG. 2 is an exploded perspective view of the container insert shown in FIG. 1.
Figure 3:
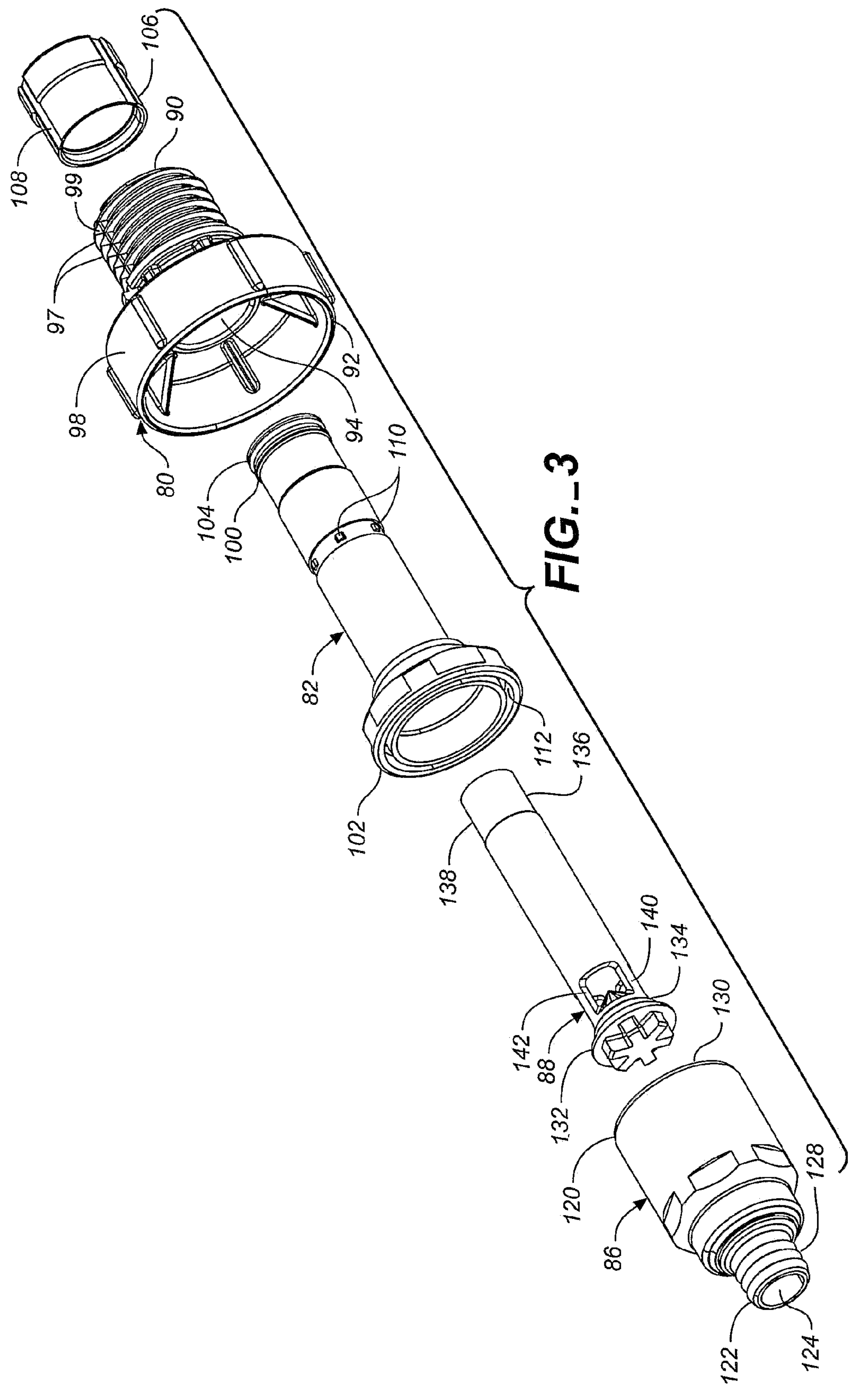
FIG. 3 is an exploded perspective view of the dispense unit shown in FIG. 1.
Figure 4:
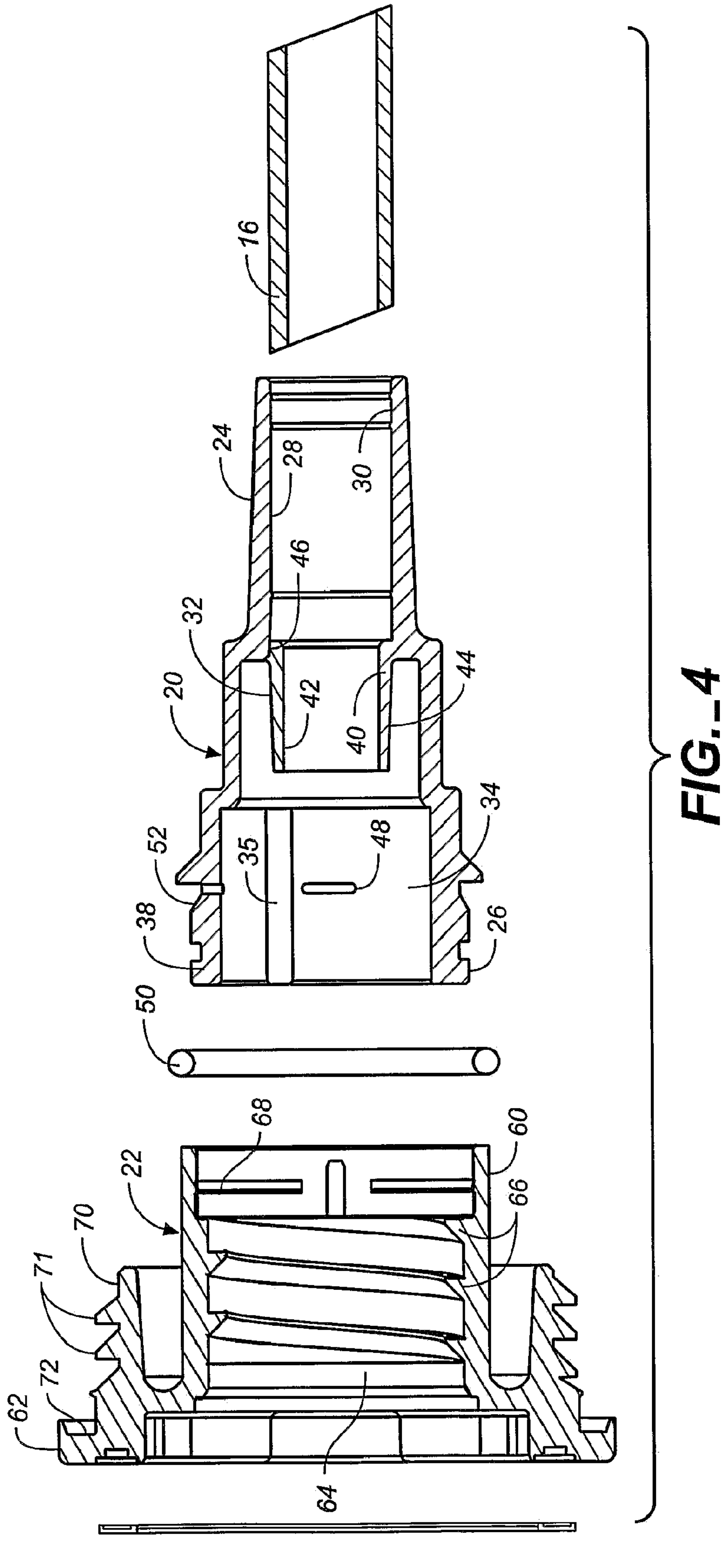
FIG. 4 is an exploded cross-sectional plan view of the container insert shown in FIG. 2.
Figure 5:
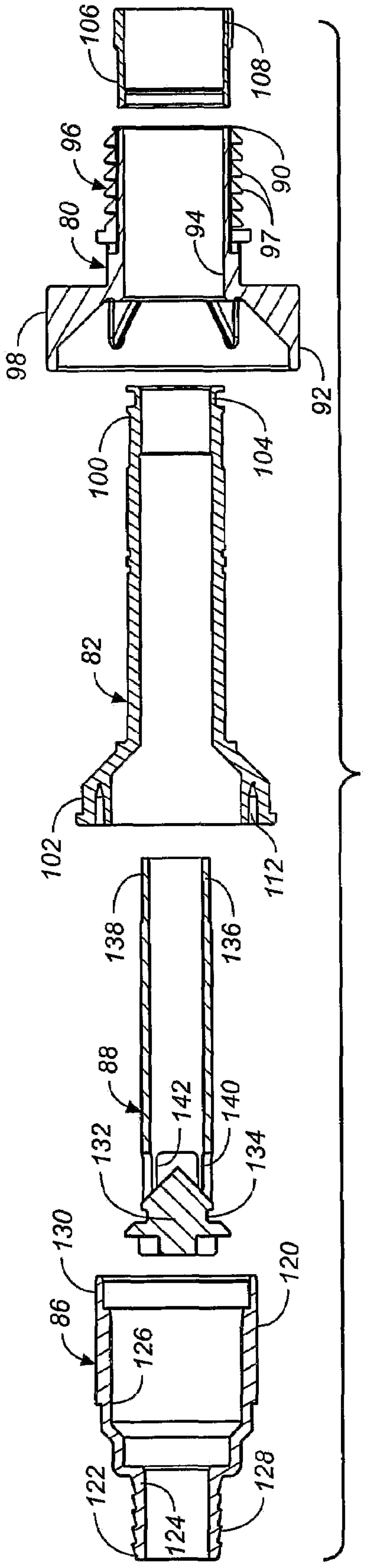
FIG. 5 is an exploded cross-sectional plan view of the dispense unit shown in FIG. 3.
Figure 6:
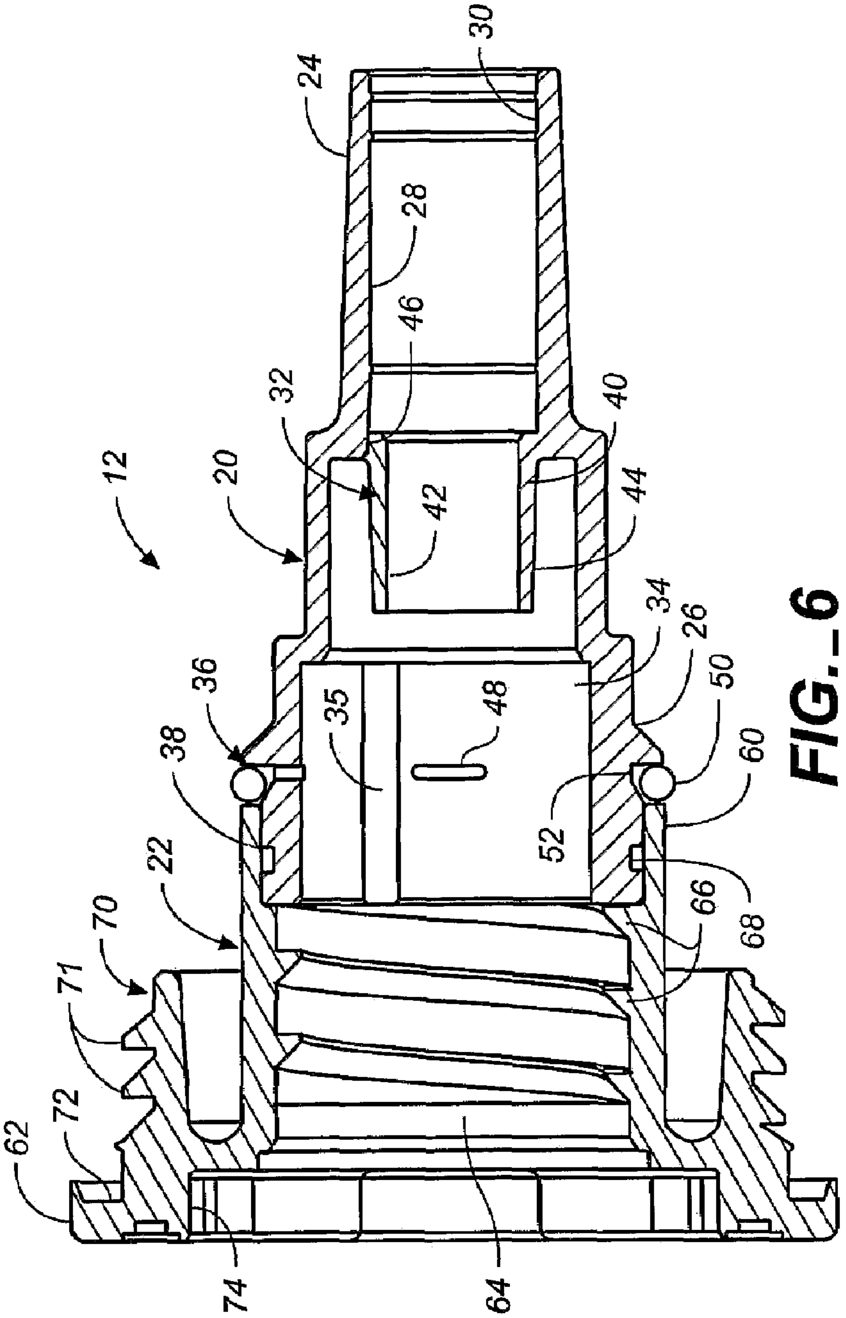
FIG. 6 is a cross-sectional view of an assembled container insert assembly shown in FIG. 1.
Figure 7:
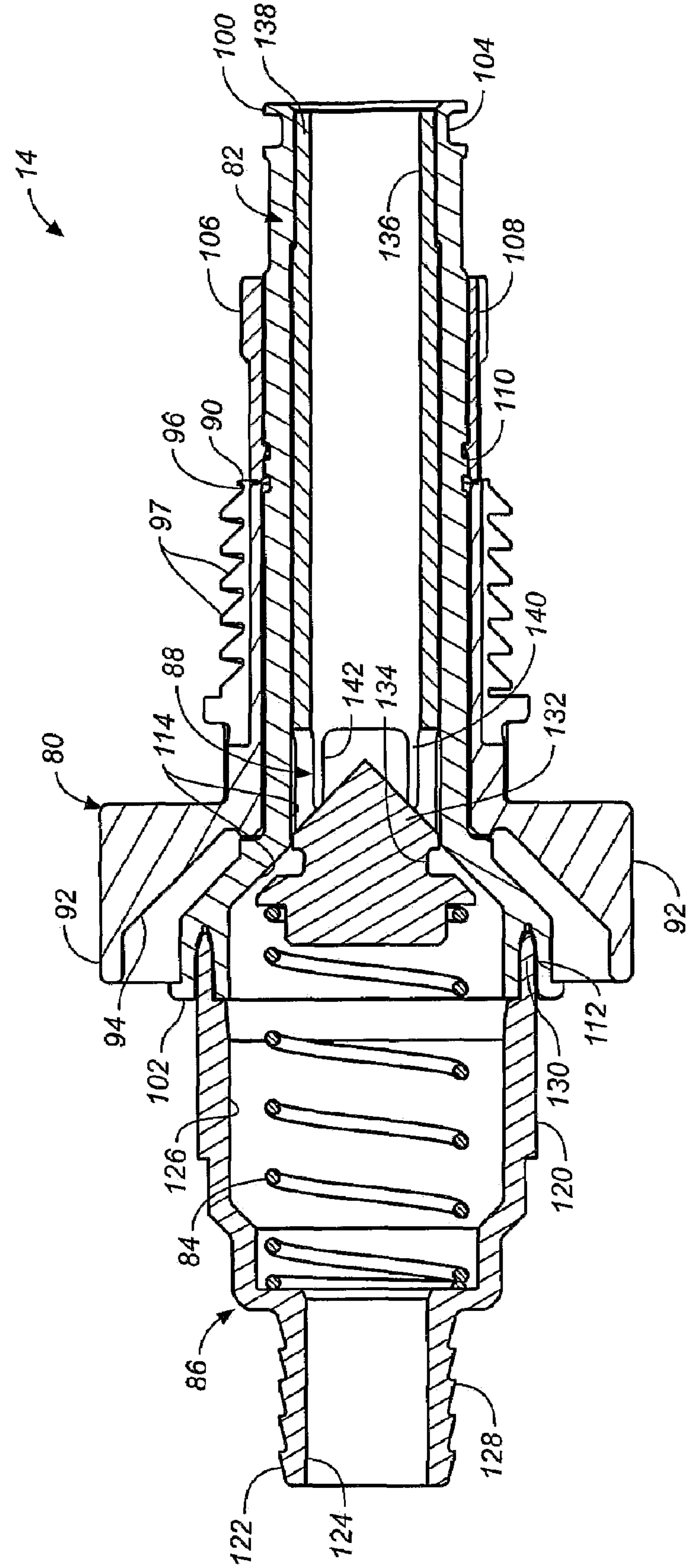
FIG. 7 is a cross-sectional view of the dispense unit shown in FIG. 1.
Figure 8:
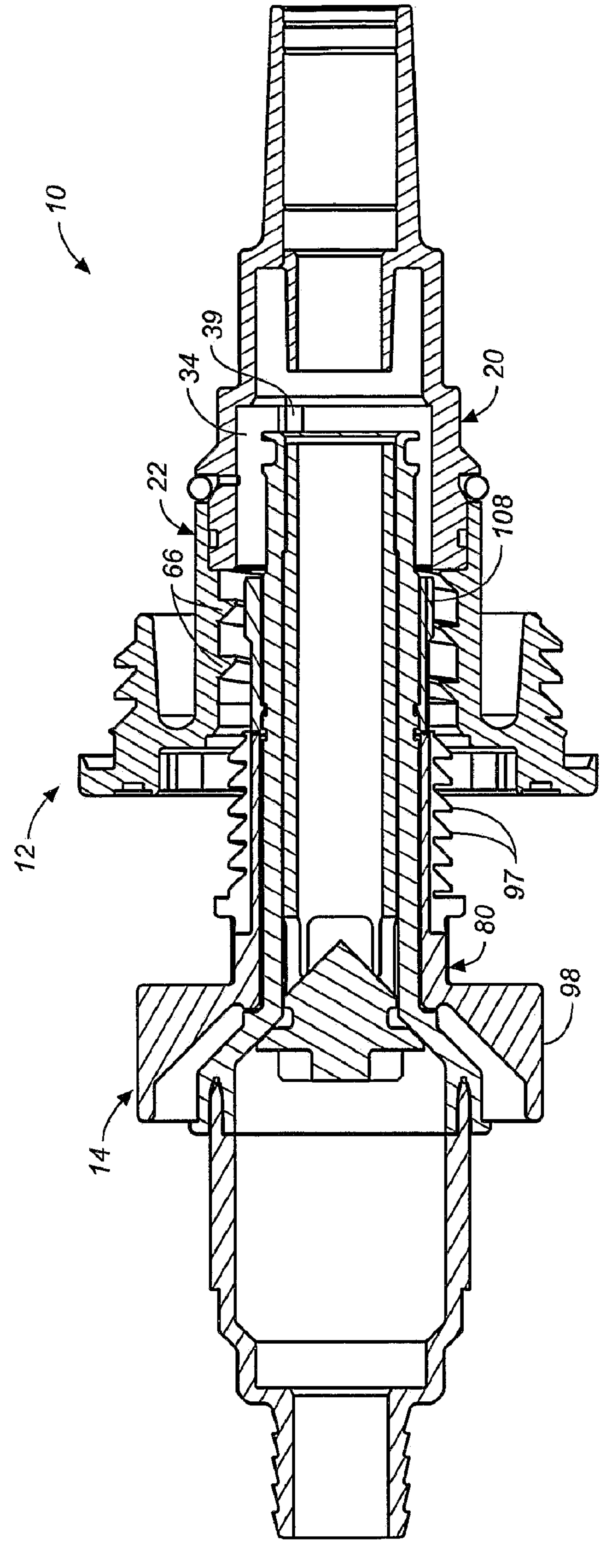
FIG. 8 is a cross-sectional view of the coupling assembly shown in FIG. 1 with the dispense unit in a first, detached position relative to the container insert.
Figure 9:
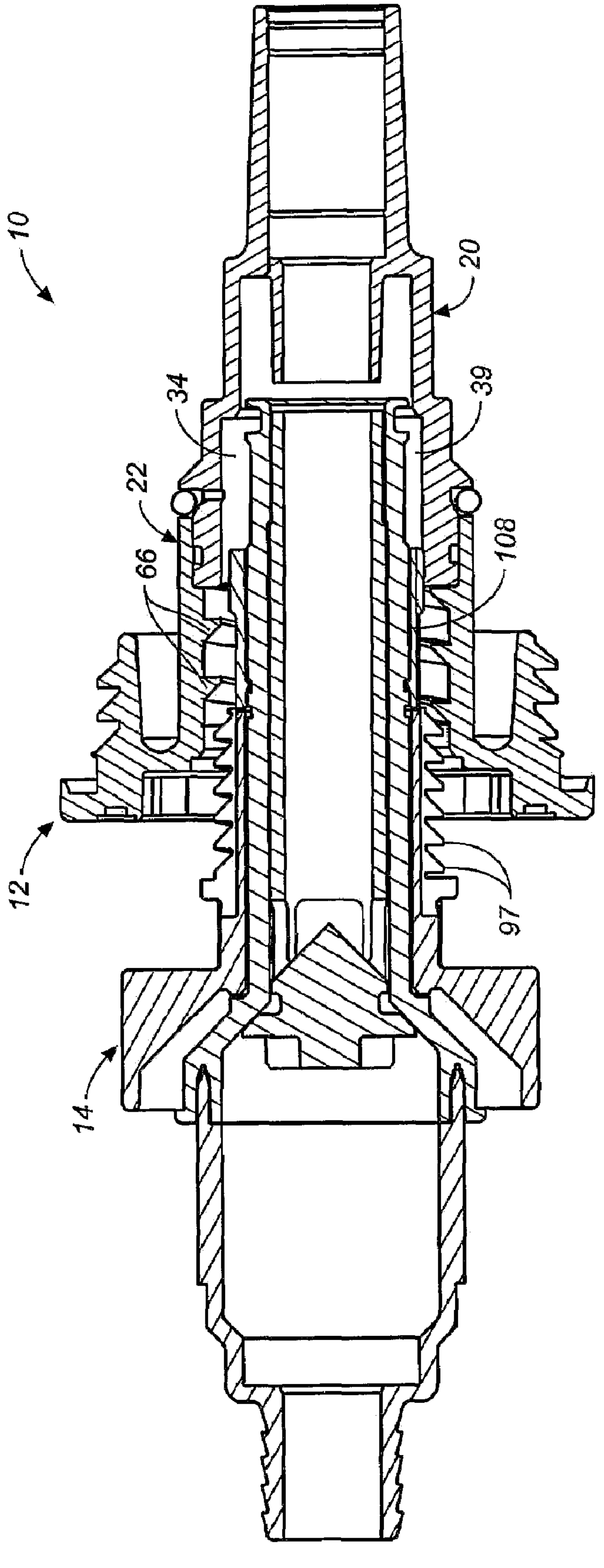
FIG. 9 is a cross-sectional view of the coupling assembly shown in FIG. 1 with the dispense unit in a second position relative to the container insert in which the keyed surface of the dispense unit is engaged with a keyed surface of the container insert.
Figure 10:
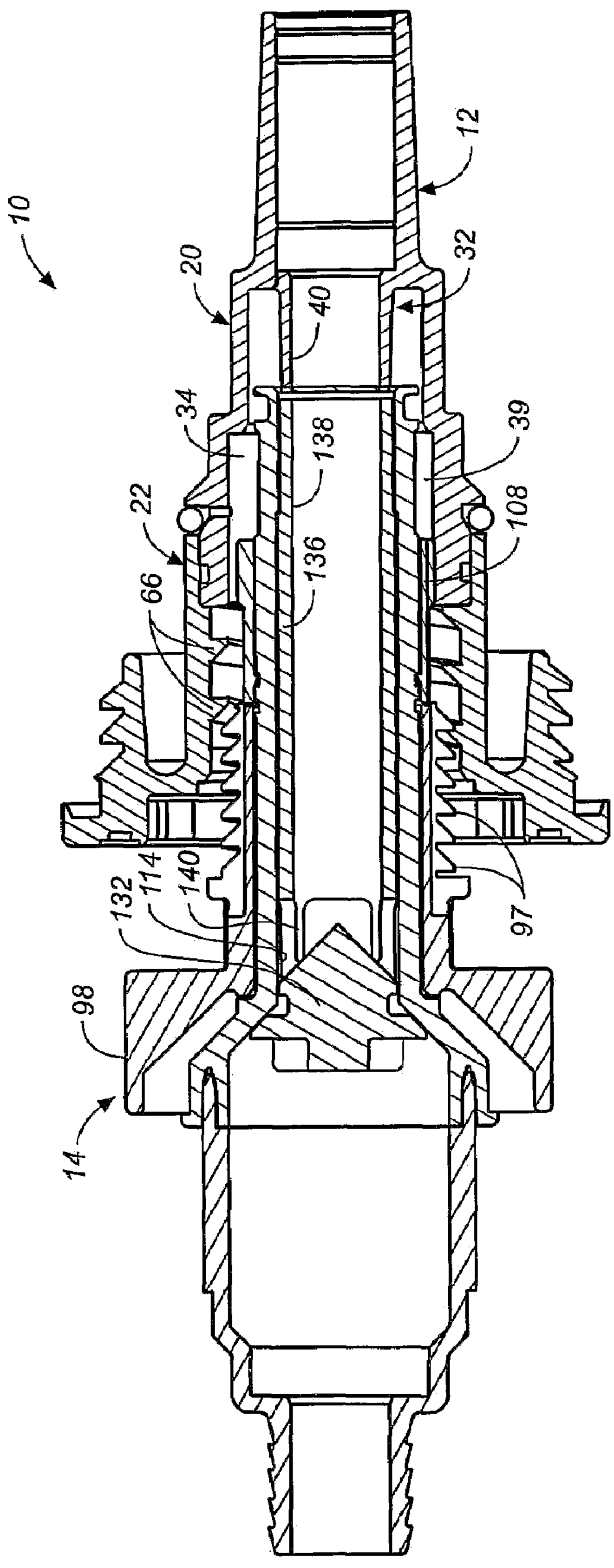
FIG. 10 is a cross-sectional view of the coupling assembly shown in FIG. 1 with the dispense unit in a third position relative to the container insert in which the threads of the dispense unit are at least partially engaged with threads of the container insert.
Figure 11:
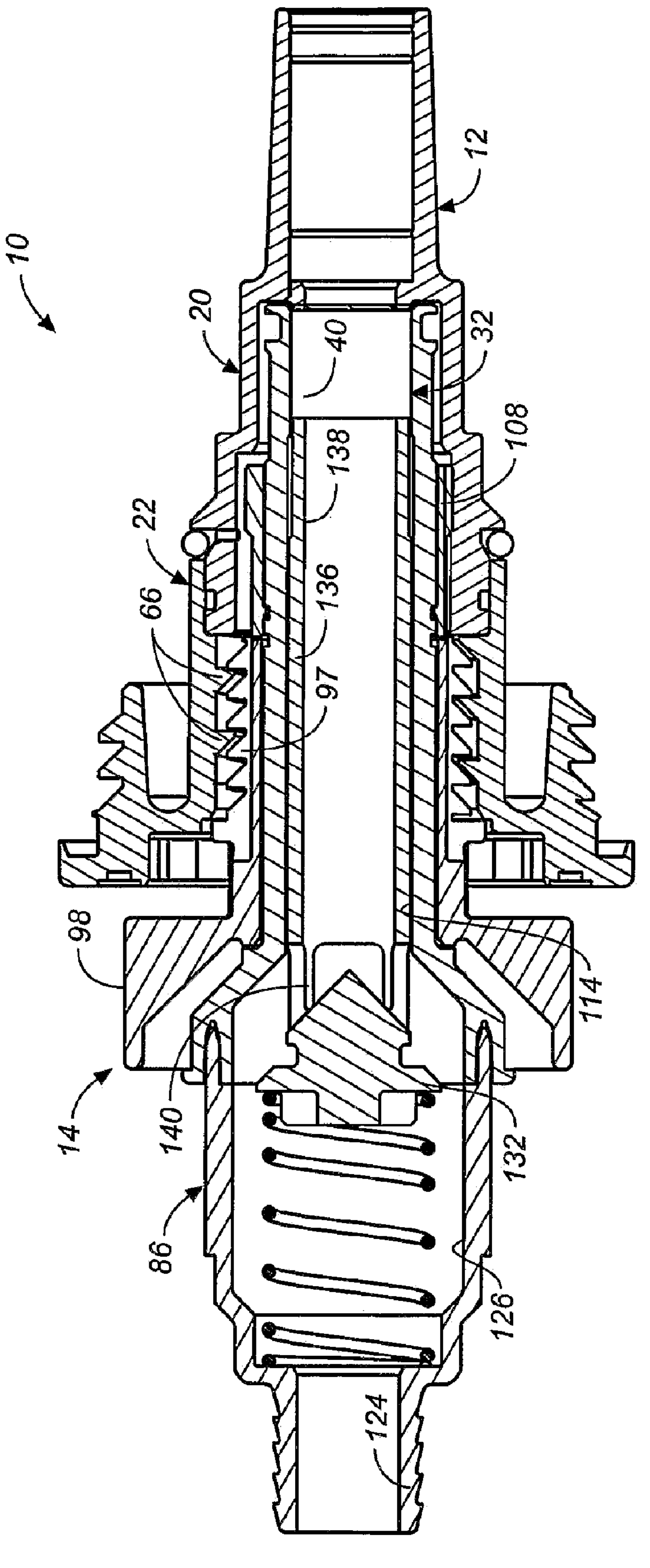
FIG. 11 is a cross-sectional view of the coupling assembly shown in FIG. 1 with the dispense unit in a fourth position relative to the container insert and the valve is in an open position.

Referring now to FIGS. 2-4, the container insert 12 includes top and bottom members 20, 22, first and second ends 24, 26, 27, an open cavity 28 that defines a flow path, a dip tube engagement surface 30, a valve engagement member 32, a keyed surface 34, a check valve assembly 36, and a top member connection surface 38. The dip tube engagement surface 30 may include ribs, channels or features on an internal or external surface of the container insert at the first end at 24 for connection of the dip tube 16. The valve engagement member 32 may include a wall structure 40 having internal and external surfaces 42, 44, and a slot 46 formed in the wall 40. The slot 46 may be useful for facilitating draining of any fluids collected around external surface 44 into the open cavity 28, thereby preventing fluids from puddling within the container insert 12 and reducing the chance for exposure by the user to the container contents.

The check valve assembly 36 includes a vent aperture 48, a venting valve member 50, and a vent valve seat 52. The interface between the vent valve member 50 and the vent valve seat 52 provides an airtight seal under normal pressure conditions between the inside of the container and atmospheric pressure outside of the container. However, when a vacuum pressure condition exists within the container, the vent valving member 50 is drawn radially outward away from the vent valve seat 52 thereby exposing the vent aperture 48 and allowing airflow from outside the container, through the container insert 12, past the vent valving member 50, and into the internal volume of the container. A venting path between the vent aperture 48 and atmospheric pressure outside of the coupling assembly 10 is described further below with reference to the dispense unit 14.

Figure 12:
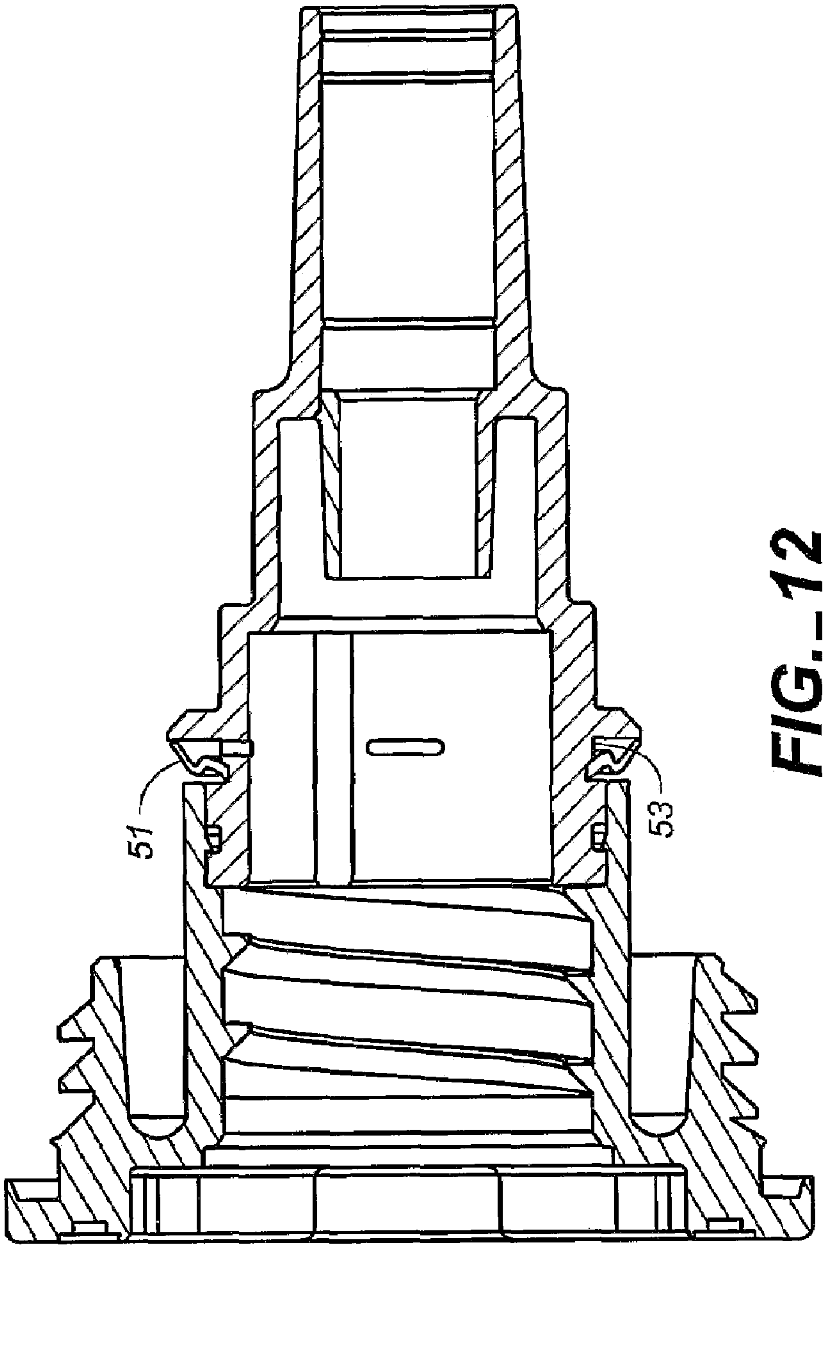
FIG. 12 is a cross-sectional view of another container insert embodiment according to principles of the present invention having an umbrella style venting member.

The vent valve member 50 is shown in FIG. 4 as an O-ring sealing structure but may have other shapes and sizes in other embodiments. For example, an umbrella style vent valve member 51, as shown in FIG. 12, can be used in combination with a slightly modified vent valve seat 53. The vent valve member 51 is only one example lip seal configuration, while many alternative lip seals and other sealing member configurations are possible for providing a similar valving function.

The bottom member 20 includes several distinct sections between the first and second ends 24, 26 that each have different internal and external diameters. These various sections and their respective dimensions may be modified in other embodiments for interfacing with alternative dispense unit configurations as well as alternative dip tube designs.

The top member 22 includes first and second ends 60, 62 and an open cavity 64 that defines a flow path through the top member 22. The open cavity includes a plurality of threads 66 formed therein, a bottom member connection surface 68, a container engagement member 70 having a plurality of threads 71, a sealing member groove 72, and an actuator seat 74. The bottom member connection surface 68 includes a small protrusion or raised lip sized to engage a recessed portion formed in the top member connection surface 38. In other embodiments, the bottom member connection surface 68 may include a groove that mates with a protrusion formed in the top member connection surface 38, or any other combination of features that provide a connection between the top and bottom members 20, 22.

In yet further embodiments, the top and bottom members 20, 22 may be integrally formed as a single piece at the intersecting point defined by features 38 and 68 shown in FIG. 4. Such a single piece unit may be difficult to form in the context of molded materials because of the combination of slots, cores, threads, apertures, and so forth involved in molding or otherwise forming features of the container insert 12. An example single piece container insert 600 is described in further detail below with reference to FIGS. 24 and 25.

The container engagement member 70 may have any number of different sizes and features for connecting to a particular container opening. For example, the member 70 may be in the form of a bung, cap, or pail cover, such as, for example, a two inch buttress bung, S56X4 buttress bung, S70X6 buttress bung, a two inch NPS or BSP bung, a DIN 61, an S63 cap, or a flex spout or other removable pail cover. FIG. 4 illustrates the container engagement member 70 including a bung style male threaded portion having a plurality of threads 71 sized to fit within a common threaded opening of a container.

The sealing member groove 72 is sized to receive an annular seal (not shown) that provides a sealing function between the top member 22 and the container. The actuator seat 74 is preferably sized for receiving a specialized drive tool for removing and installing the container insert 12 in a container with a desired amount of torque force.

Figure 1A:
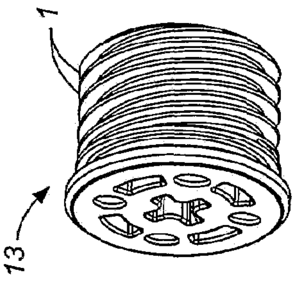
FIG. 1A is a perspective view of an example shipping cap that may be used with the coupling assembly shown in FIG. 1.

A shipping cap such as, for example, shipping cap 13 shown in FIG. 1A, may be used to seal a container when the dispense unit 14 is not coupled to the container insert 12. The shipping cap 13 includes threads 1 formed on an outer surface thereof that are sized to engage the internal threads 66 of the top member 22. Shipping cap 13 also includes a sealing member seat 2 sized to retain a sealing member such as an O-ring or similar structure that is capable of forming a seal between an outer circumference surface of the sealing member (not shown) and an inner surface of the container insert.

The shipping cap 13 may also include an actuator seat 3 that is configured for engagement by an off-the-shelf tool such as, for example, a #4 Phillips or a ⅜" flat standard screwdriver, or a standard square, hexagon, or torque type driving tool structure. Although it is possible to form actuator seat 3 with features that would require a specialized installation tool for installing and removing the container insert, or applying a specific amount of torque in doing so, the actuator seat 3 is preferable configured to provide a relatively reliable seal that can be established with a relatively low amount of torque using a relatively conventional tool available to most users. Thus, the shipping cap 13 provides additional convenience for a user while minimizing the chances of damaging the cap 13 or container insert from the user over tightening the shipping cap 13, which may more frequently occur when using specialized tools.

Referring now to FIGS. 1-3 and 5-10, the dispense unit 14 includes a coupling ring 80, a coupling sleeve 82, a spring 84, an adapter member 86, and a valve assembly 88. The coupling ring 80 includes first and second ends 90, 92, an open cavity 94 defining a flow path through the coupling ring 80, a drum insert engagement surface 96 having a plurality of threads 97, an actuator surface 98, and a vent slot 99 formed in the engagement surface 96. The drum engagement surface 96 and associated threads 97 are configured to engage the plurality of threads 71 of the container engagement member 70. The actuator surface 98 may be used by a user to rotate the engagement surface 96 once the threads 97 are in position for engagement with the threads 71 of the container insert 12. The vent slot 99 provides a vent path between air outside of the coupling assembly 10 a space beyond the sets of threads 97, 71 in the coupling assembly 10.

The coupling sleeve 82 includes first and second ends 100, 102, a sealing member seat 104, a key member 106 having a plurality of key slots 108 formed in an exterior surface of a key member 106, a plurality of interference members 110 formed on an exterior surface of the coupling sleeve 82, an adapter connection member 112, and a poppet sealing surface 114. The sealing member seat 104 is positioned at the first end 102 and is configured to receive a sealing member (not shown) such as an O-ring that provides a fluid seal between the first end 100 of the coupling sleeve 82 and the open cavity 28 of the bottom member 20 of the container insert 12.

The key member 106 may be integrally formed into the coupling sleeve 82 or may be a separate member (as shown in the Figures) that is snap fit or otherwise coupled to the coupling sleeve 82 at a predetermined position. When key member 106 is a separate member, it may be used to retain the coupling ring 80 in a predetermined position along the length of the coupling sleeve 82 between the first and second ends 100, 102. Key member 106 may include a plurality of key slots 108 (see FIG. 1) that are sized to engage a plurality of key members 35 formed on the key surface 34 of the container insert 12. Preferably, the key slots 108 are slightly larger in size than the key members 35 so as to provide a venting path along the length of the slots 108 between an end of the vent slot 99 and the vent apertures 48 formed in the check valve assembly 36 of the containment insert 12. Thus, the combination of the vent slot 99, the key slots 108 (particularly the key slots 108 that are not coupled to a key member 35) and the check valve assembly 36 provides an air flow path from outside the container to inside the container when the coupling assembly 10 is properly mounted to a container and is in use removing contents of the container. A reduced diameter on key member 106 relative to the diameter of the keyed surface 34 of the container insert 12 is a primary source of venting between the vent slot 99 and the vent aperture 48.

The interference members 110 may be formed at spaced locations around a circumference of the couplings sleeve 82 in alignment with the coupled axial position of the key member 106 to the coupling sleeve 82. Interference members 110 contact an inner diameter surface of the key member 106 thereby providing a releasable connection with key member 106. The interference forces between the key member 106 and the interference members 110 can be overcome using a predetermined amount of torsional force as applied to either the key member 106 or the coupling sleeve 82 when one or the other of those parts is maintained in a fixed rotated position. The use of multiple interference members rather than a single continual circumferential surface to provide an interference fit is advantageous for several reasons. One reason is that the contact surface area between the interference members 110 and the inner diameter surface of the key member 106 is relatively small, which makes it possible to overcome the interference fit tension force with relative ease. Second, the use of multiple, relatively small interference members reduces the need for high manufacturing tolerances as compared to the tolerances needed to form a continuous interference surface around an entire circumference of a cylindrical member.

The use of an interference fit between the key member 106 and the coupling sleeve 82 is advantageous for moving the key slots 108 into an aligned rotated position relative to the key members 35 of the container insert 12. However, the relative ease in overcoming the interference forces between the key member 106 and the interference surface 110 makes it possible to rotate the remaining coupling sleeve members 82 relative to the container insert 12 after the slots 108 and key members 35 are engaged. This option may be helpful, for example, when there is a need to rotate the hose or dispense line (not shown) that is coupled to the dispense unit 14 for removing the container contents (e.g., to remove kinks from the tube).

The adapter housing connection member 112 is configured with a slot or other structure sized to receive the adapter member 86 thereby providing a positive connection between the adapter member 86 and the coupling sleeve 82. The adaptor housing connection member 112 may have alternative designs to those shown in the Figures to provide, for example, a releasable connection or a permanent connection between the coupling sleeve 82 and the adapter member 86.

The poppet seat surface 114 extends within an interior diameter of the coupling sleeve 82 and provides a fluid seal between the valve assembly 88 and the coupling sleeve 82. In some embodiments, the poppet seat surface 114 may be at other locations along the length of the coupling sleeve 82 depending on, for example, the size, shape, and position of various valve assembly members and the desired sealing surface defined by the valve assembly members.

The spring 84 is positioned within the adapter member 86 and provides an axial tension force against the valve assembly 88, thereby maintaining a seal between the valve assembly 88 and the coupling sleeve 82 when the dispense unit 14 is in a rest state. The spring 84 may be made from any material suitable for the coupling assembly 10 application, and may include, for example, polymer materials, metal materials, or embedded metal materials.

Adapter member 86 includes first and second ends, 120, 122, first and second bore sections 124,126, an adapter portion 128, and a coupler sleeve connection member 130. The first bore section 124 is sized to connect to a dispense line (not shown), and second bore section 126 is sized to house the spring 84. Other embodiments may include additional bore sections and different sized first and second bore sections 124, 126 to accommodate different dispense unit features. The adapter portion 128 may include structures on an external surface thereof that assist in providing a sealed connection with a dispense line. The connection member 130 may have any desired configuration for securing the adapter member 86 to the coupling sleeve 82 with a releasable or a permanent connection.

The valve assembly 88 includes a poppet 132, a sealing member seat 134, and a poppet activator 136 having first and second ends 138, 140. The poppet 132 is shaped to form a seal with the poppet seat surface 114 of the coupling sleeve 82. The poppet 132 may seal with the coupling sleeve 82 at various positions on the poppet 132 such as, for example, on a slanted surface or on a surface extending parallel to an axis of the dispense unit 14. The sealing member seat 134 is sized to receive a sealing member such as, for example, an O-ring that provides additional sealing function between the valve assembly 88 and the coupling sleeve 82.

The poppet activator 136 extends axially from a rest position of the poppet 132 to the first end 100 of the coupling sleeve 82. The second end 140 may include a plurality of openings adjacent to the poppet 132 to promote flow of the container contents through the valve assembly 88. The first end 138 of the poppet activator 136 is configured to contact the valve engagement member 32 of the container insert 12. Engagement of the poppet activator 136 with the valve engagement member 32 is shown and described further with reference to FIGS. 7-10 below. In use, the poppet activator 136 moves the poppet 132 against the axial forces applied by spring 84 to open and close the valve assembly 88.

Coupling assembly 10 provides for a unique progressive coupling and valving sequence as shown and described with reference to FIGS. 7-10. When coupling the container insert 12 and dispense unit 14 together (see FIG. 7), the first end 90 of the coupling ring, first end 100 of the coupling sleeve, and the first end 138 of the poppet activator are inserted into the open cavity 28 of the bottom member 20 and the open cavity 64 of the top member 22 of the container insert 12 until the key member 106 of the coupling sleeve 82 engages the keyed surface 34 of the container insert 12. The key member 106 may be rotated due to the interference connection with the interference members 110 of the coupling sleeve 82 and the coupled connection between the coupling sleeve 82 and the adapter member 86 to align the key slots 108 with the key members 35 of the container insert 12. When the key slots 108 and key members 35 are properly aligned, features 108, 35 can move axially but not rotationally relative to each other, thus allowing the dispense unit 14 to move further axially relative to the container insert 12 until the threads 97 of the drum insert engagement surface 96 of coupling ring 80 engage the threads 66 of the top container insert member 22 (see FIG. 8).

With the threads 97 and 66 contacting each other, the threads 97 can be rotated relative to the threads 66 by rotating the actuator surface 98. Preferably, the coupling ring 80 can rotate freely relative to the coupling sleeve 82, thus making it possible for the key features 108, 35 to remain in engagement with each other and continue to move axially relative to each other while the threads 97 rotate relative to the threads 66. Continued rotation of the threads 97, 66 relative to each other moves the entire dispense unit 14 axially relative to the container insert 12 until the poppet actuator first end 138 contacts the wall 40 of the valve engagement member 32 (see FIG. 9). Continued rotation of the threads 97 via the rotation of the actuator surface 98 then moves the coupling sleeve 82 axially relatively to the poppet activator 136 because the poppet activator 136 is held in a stationary axially position due to contact with the wall 40. As a result, the poppet activator 136 moves the poppet 132 axially relative to the poppet seat surface 114 of the coupling sleeve 182 until the plurality of openings in the second end 140 of the poppet activator 136 are exposed to fluid communication with the adaptor member first and second sections 124, 126 (see FIG. 10).

The sequence of connecting and valving functions for the coupling assembly 10 ensures: 1.) proper keying of the container insert 12 and dispense unit 14 features, 2.) a positive connection between the container insert 12 and dispense units 14, and 3.) opening of the valve for dispensing of the contents of the container.

Figure 13:
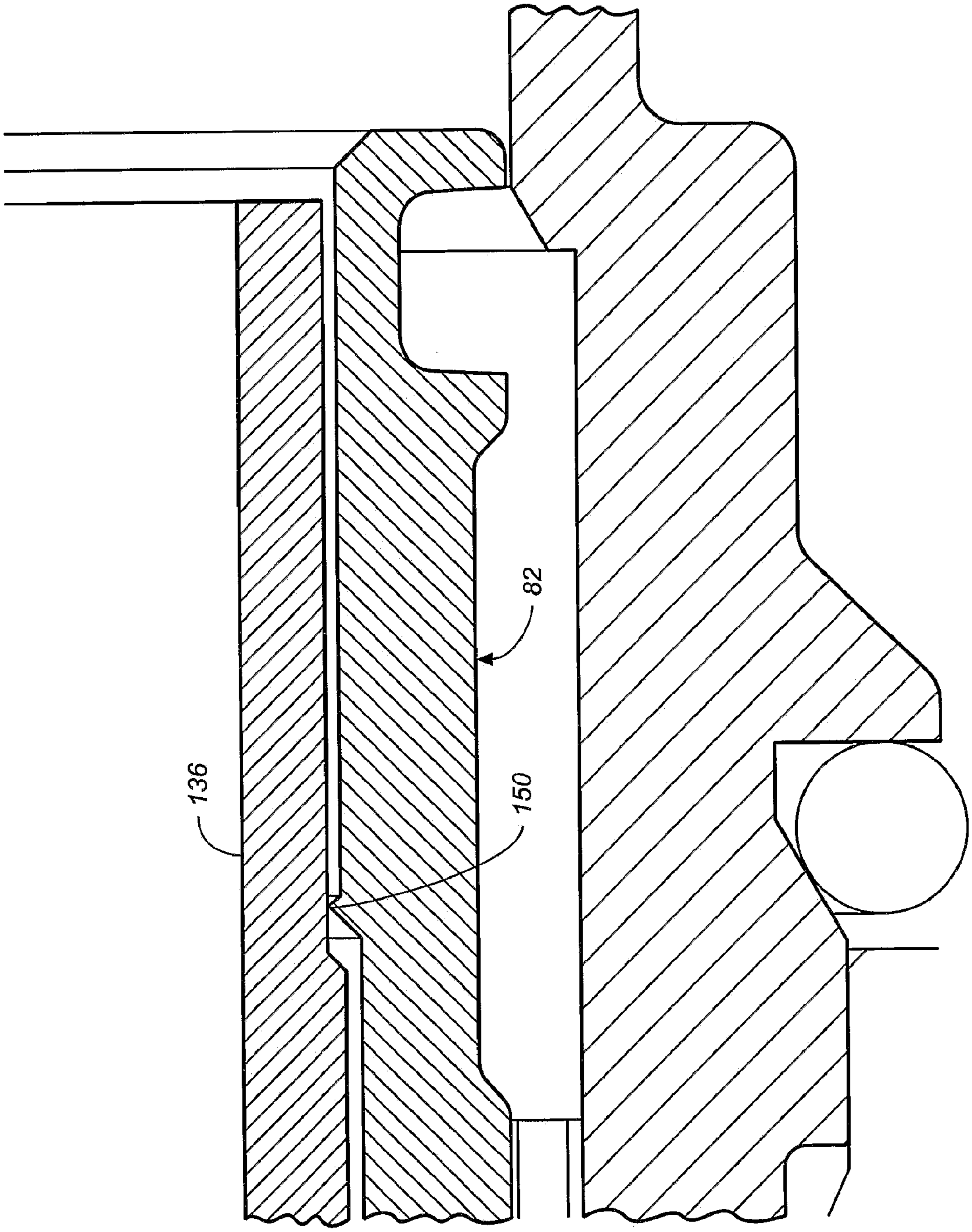
FIG. 13 is a close-up view of a wiper rib feature of the dispense unit shown in FIG. 7.

To further reduce spillage when disconnecting the container insert 12 and dispense unit 14, the coupling sleeve 82 may include a wiper rib 150 positioned in contact with an outer circumference surface of the poppet activator 136, as shown in the detailed view of FIG. 13. The wiper rib 150 prevents fluids captured between the poppet activator 136 and the coupling sleeve 82 from exiting that space as the poppet 132 and a poppet activator 136 move relative to the coupling sleeve 82. The wiper rib 150 may be particularly useful when handling high viscous materials that would not otherwise drain quickly from the space between the coupling sleeve 82 and valve assembly 88 into the space surrounding the outer surface of the wall 40 for draining through the slot 46 and out of the container insert 12 at the time of removing the dispense unit 14 from the container insert 12.

Figure 14:
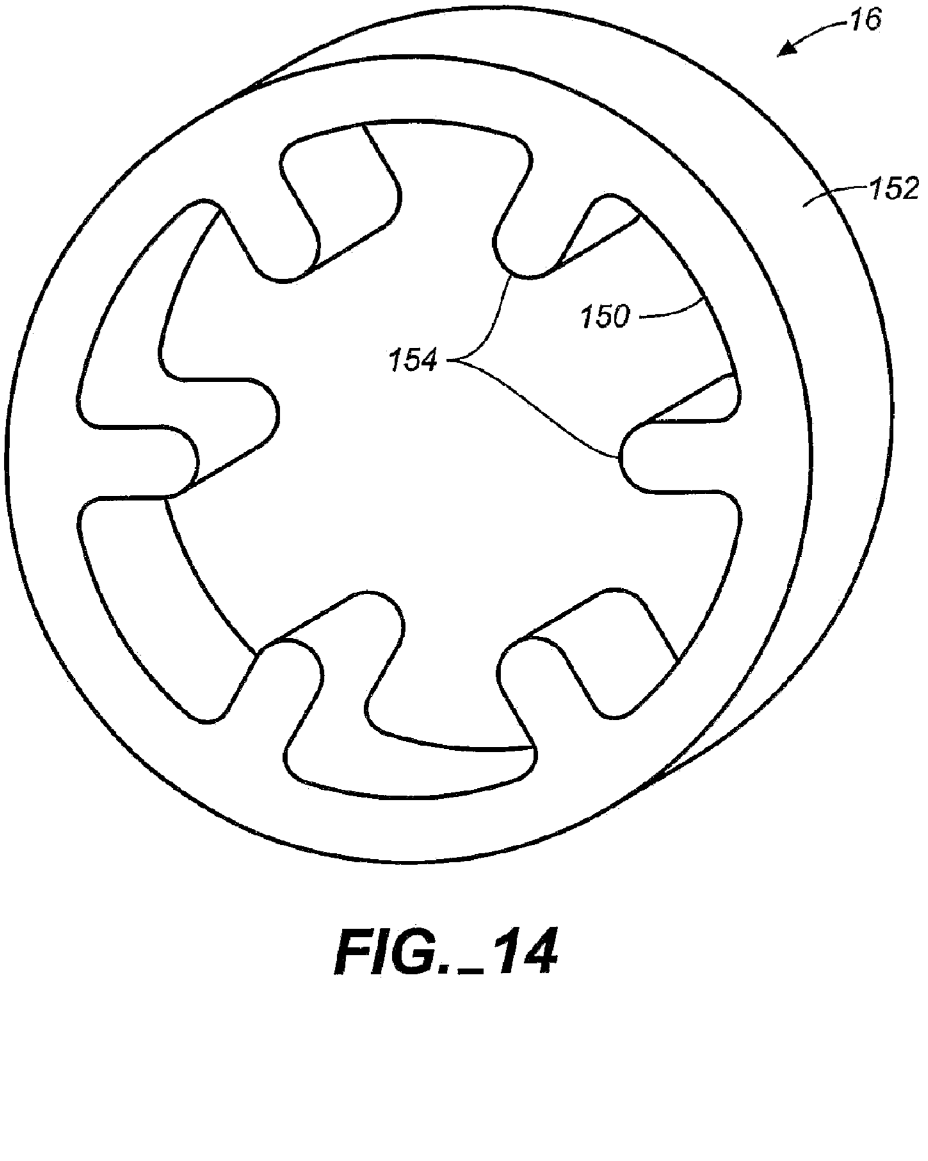
FIG. 14 is a cross-sectional view of the dip tube shown in FIG. 4.

The dip tube 16 may include a plurality of radially extending support structures 154 as shown in FIG. 14. The support structure 154 may extend radially inwardly into the internal volume defined by the dip tube, or may extend radially outwardly (not shown). The radial ribs 154 may provide resistance to deformation of the dip tube along its length. Radial ribs 154 may also provide additional stiffness enabling the use of a relatively small diameter dip tube, thus enhancing the primeability of the dip tube compared as compared to a larger diameter dip tube. The ability of a dip tube to be primed is based primarily on the volume of the fluid in the tube and wetting friction between the tube and the fluid. The radial ribs 154 may enhance priming of the dip tube 16 when the ribs 150 extend radially inwardly in the dip tube 16 due to increases in wetting friction related to increased surface area.

Figure 15:
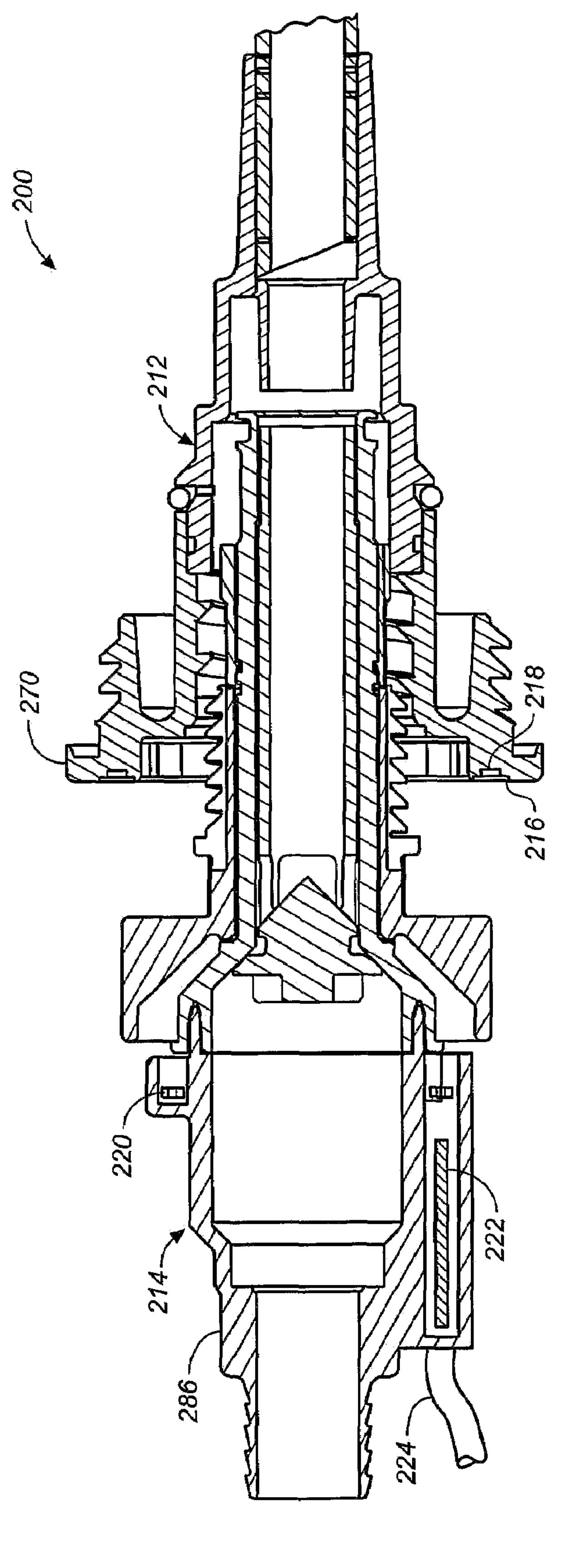
FIG. 15 is a cross-sectional view of another example coupling assembly that includes a reader assembly according to principles of the present invention.
Figure 16:
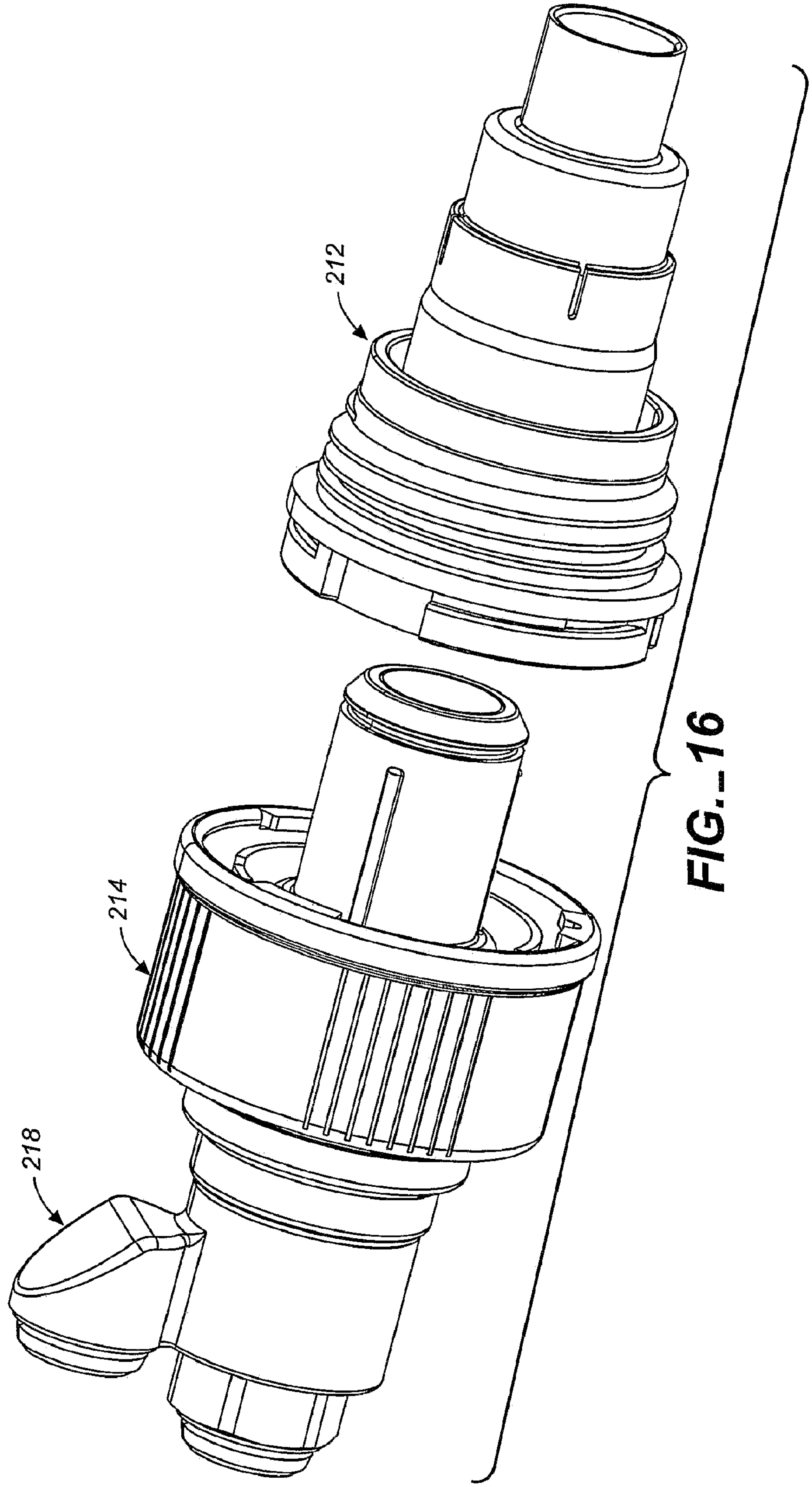
FIG. 16 is a perspective view of another example coupling assembly incorporating principles of the present invention.
Figure 17:
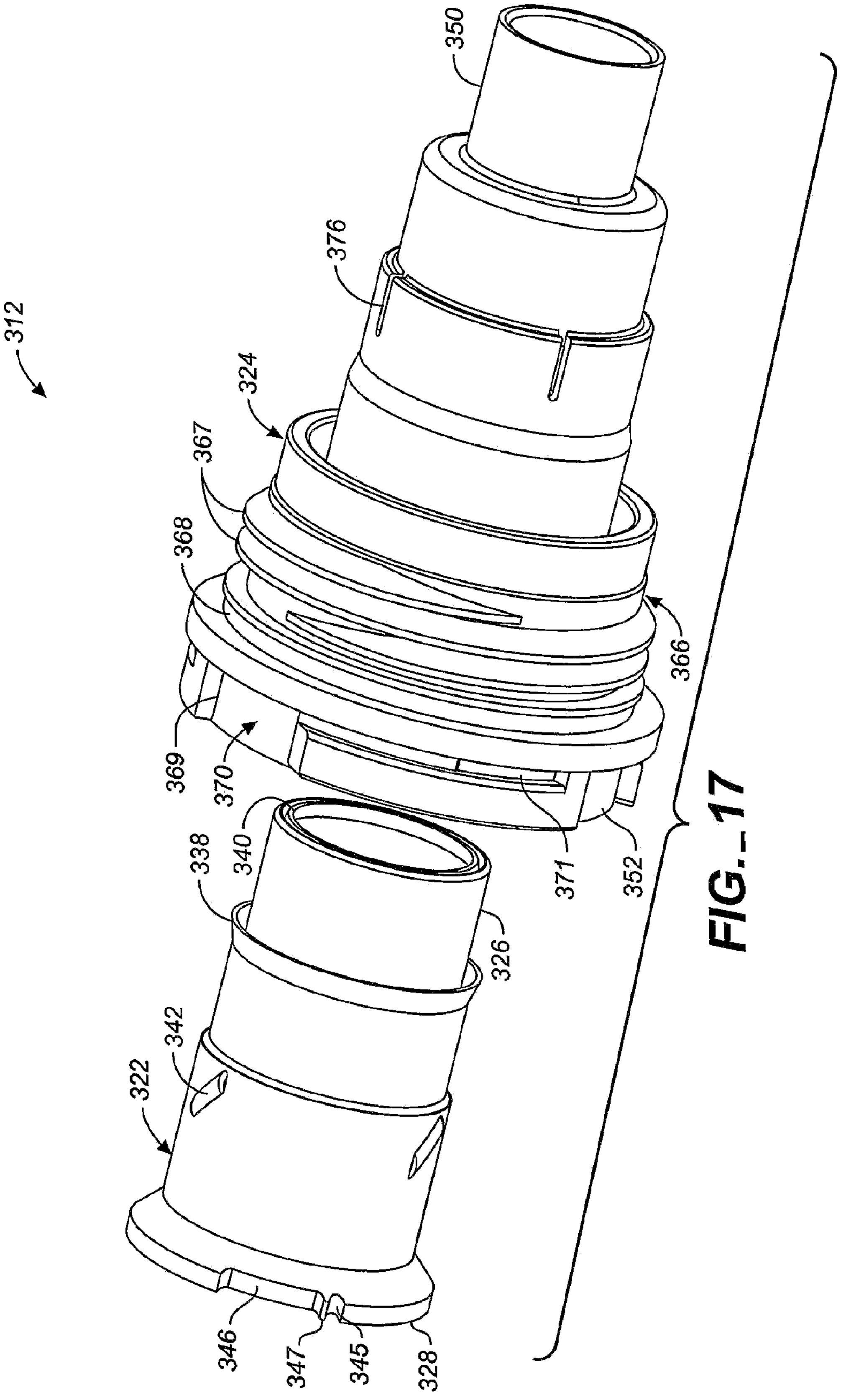
FIG. 17 is an exploded perspective view of the container insert shown in FIG. 16.
Figure 18:
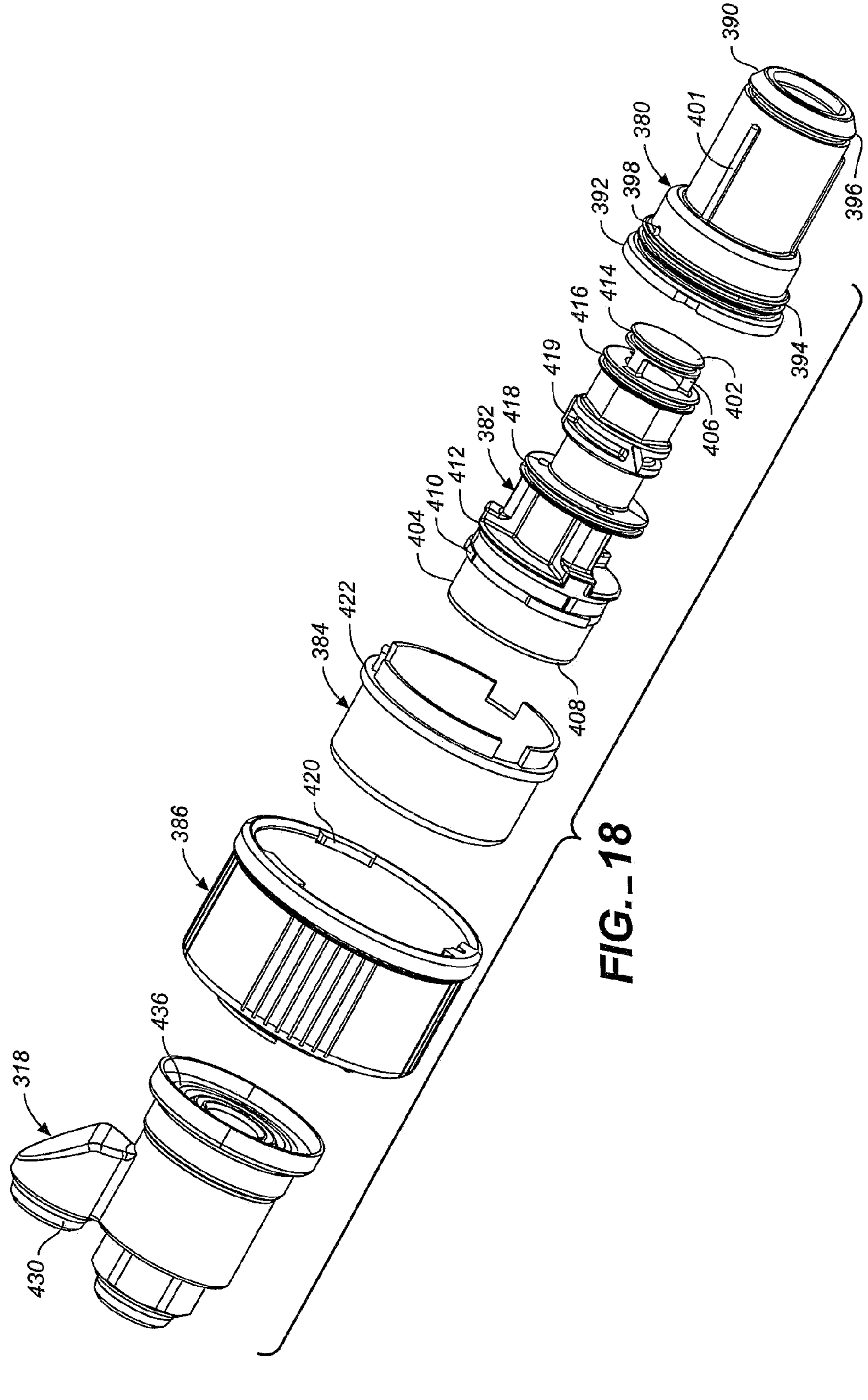
FIG. 18 is an exploded perspective view of the dispense unit and adapter manifold shown in FIG. 16.
Figure 19:
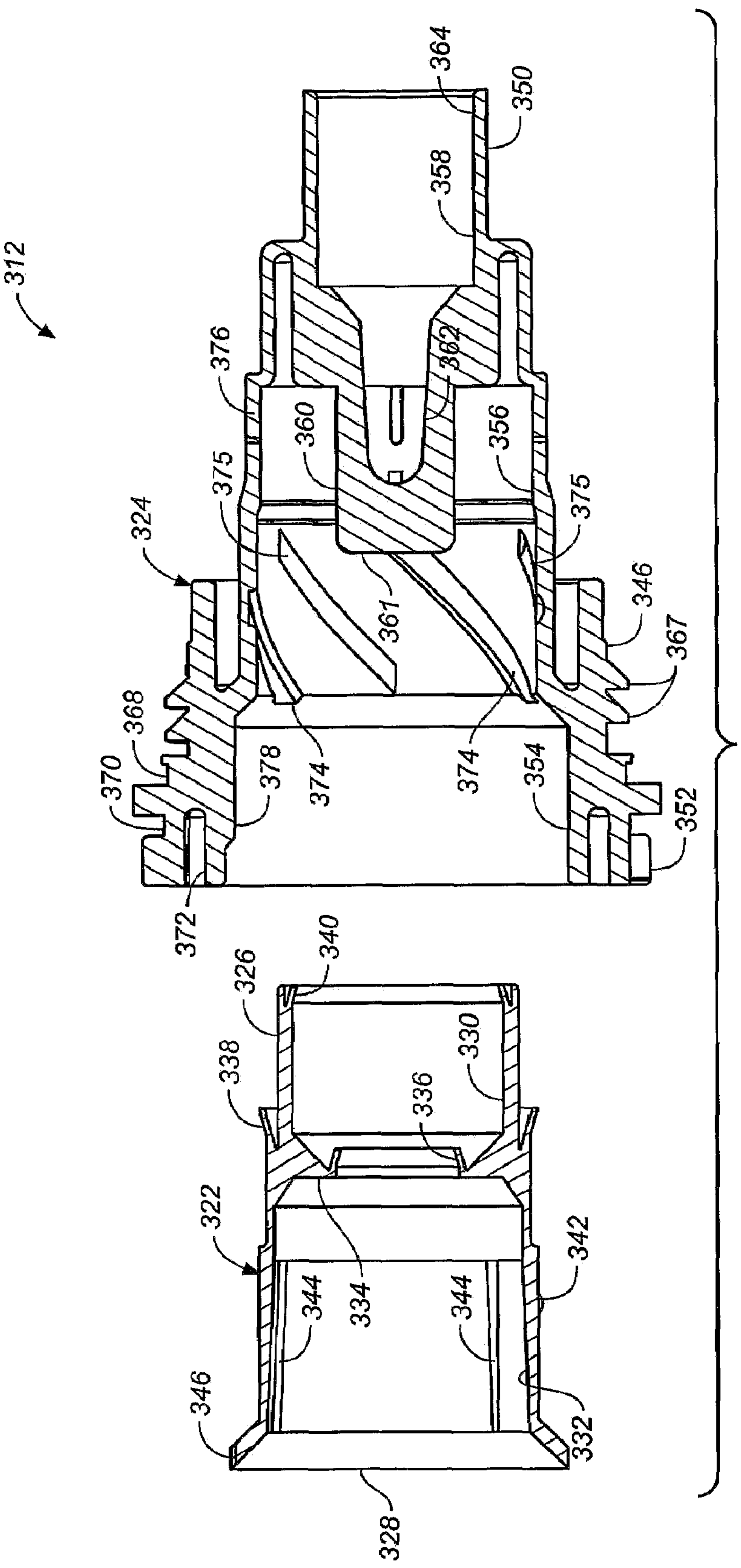
FIG. 19 is an exploded cross-sectional plan view of the container insert shown in FIG. 16.
Figure 20:
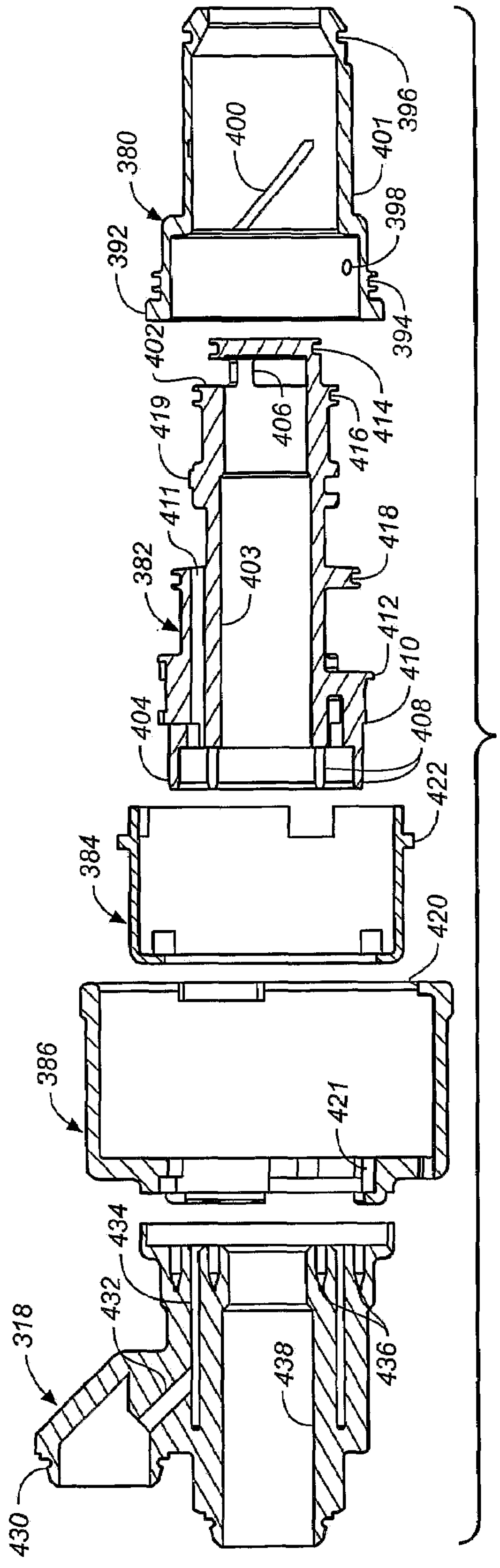
FIG. 20 is an exploded cross-sectional plan view of the dispense unit and adapter manifold shown in FIG. 16.

In another coupling assembly configuration 200 shown in FIG. 15, the coupling assembly 200 includes a "smart reader" system for identifying information related to the container and the container contents. The coupling assembly 200 includes a container insert 212, a dispense unit 214, and an adapter member 286 having a reader board 222 and a reader antenna ring 220 attached thereto. The reader board 220 and reader antenna ring 220 may be coupled to a remote system via a power cable 224 or a wireless system (not shown), and are used to read information from a tag ring 218 that is covered with a tag cover 216 in the container insert 212. The tag ring 218 is mounted to a container engagement member 270 of the container insert 212 on a surface facing the dispense unit 214 such that the tag ring 218 is in a line of communication with the reader antenna ring 220. The tag ring 218 may include information related to the identity of the container such as the size and certification, and information related to the container insert such as, for example, a certification ratings, number of uses, the contents of the container, the dates when the container was filled or emptied, and the length of time of connection between the container insert 212 and dispense unit 214.

The coupling assembly 10 is configured to maximize the cross sectional flow opening out of the container through assembly 10, thereby enabling a larger flow capacity than would otherwise be obtainable with known coupling assemblies. By positioning the primary valve features (e.g., poppet 132, spring 84 and portions of the poppet activator 136) outside of the container insert 12, the width of those features does not directly affect the flow area that is otherwise restricted by the container opening diameter. For example, if the poppet 132 were positioned within the container engagement member 70 inside the opening of the container, the poppet diameter would have to be reduced significantly, which would relate to a much smaller cross sectional area of the poppet activator 136 in order for all the features (for example, the bottom member connection surface 68, the coupling sleeve 82, the key member 106, etc.) to fit within the container opening.

There are several advantages to using the multiple piece container insert 12 as described above. Using separate bottom and top members 20, 22 makes it possible to reduce the cost of generating different top member designs for different container openings and different bottom member designs for different key configurations. For example, when producing container inserts for an industry that uses the same container opening but many different keyed systems that relate to, for example, different container contents (e.g., chemicals, food, etc.), several different bottom member configurations may be produced and secured to the same top member configuration. In another example, one particular bottom member may be produced, for example, for a single container content that must be stored or shipped in many different container sizes having different container opening configurations. As a result, many different top member configurations may be produced and separately coupled to the single bottom member configuration.

The multiple piece dispense unit 14 may provide another advantage by using a separate key member that is coupled to the coupling sleeve 82. A separate key member 106 can be produced for many different key configurations related to, for example, different container contents, industries, etc. Thus, the majority of the dispense unit 14 components can be produced with a single design while only the key member 106 is changed and separately coupled to the couplings sleeve 82 for different keying configurations and applications. In other embodiments, the features of key member 106 may be integrally formed into the coupling sleeve 82, which option may be well suited for high production of a single key configuration.

Referring now to FIGS. 16-23, another coupling assembly embodiment 300 includes a container insert 312, a dispense unit 314, and an adaptor manifold 318. Coupling assembly 300 includes a dual valve system with one valve associated with the container insert 312 and a second valve associated with the dispense unit 314. The two-valve system of coupling assembly 300 is particularly advantageous for reducing spillage of fluids at the time of disconnect and for eliminating substantially all contact between a user and the container contents at all times.

Coupling assembly 300 is essentially a fully closed system that includes a shut-off valve in the container insert and may include a shipping cap (not shown) to ensure sealing of the container contents and the container insert 312 during shipping. When in the connected state, a sealed event path is provided for (discussed further below) for allowing make-up air or the addition of an inert gas such as Nitrogen into the container through a port in the coupler assembly 300.

Because the container insert 312 and the dispense unit 314 include separate valving features and valving features typically have a relatively high cost, it may be difficult to design the coupling assembly 300 to be "disposable" like some of the components of coupling assembly 100 described above. Preferably, at least the dip tube 316 and any seals, caps, or covers for the coupling assembly 300 are "disposable" in nature. In the event that components of coupling assembly 300 can be made in high quantities (for example, 1 to 2 million parts) it may be possible to implement tooling and other production functions that would permit disposability of some coupling assembly components.

The coupling assembly 300 is preferably designed for use in most industrial pure grade (IPG) applications and may be designed for high pure grade (HPG) applications by using, for example, virgin resin for wetted components. In order to meet high pure grade applications, the wetted materials could be made of a polymer material such as PEEK, PPS, or PTFE/FEP, clean room assembly using Class 100 clean room bags may be used, and the coupler assembly is preferably configured for DOT/UN certification for shipping purposes.

The coupling assembly 300 does not include springs in the flow path and may also include a check valve in the dip tube (such as the check valve 500 shown in FIGS. 26 and 27) to further isolate the container contents from the user. Further, the container insert 312 preferably includes materials and requires manufacturing methods that result in a product that has lower costs than the dispense unit and therefore can have a shorter life cycle if desired.

Referring now to FIGS. 17, 19, 21 and 22, the container insert 312 includes an insert sleeve 322 and a base 324. The insert sleeve 322 includes first and second ends 326, 328, first and second bore sections 330, 332, a poppet valve contact portion 334, first, second and third lip seals 336, 338, 340, a plurality of track followers 342, and first and second key cutouts 344, 346. The base 324 includes first and second ends 350, 352, first, second, and third bore sections 354, 356, 358, a valve protrusion 360 having a plurality of openings 362 formed therein, and a dip tube engagement surface 364 configured to receive a dip tube (not shown). Base 324 also includes a container engagement surface 366 having a plurality of threads 367, a sealing member seat 368, a coupling ring seat 370, a collar seat 372, a plurality of helical vent tracks 374 (generally rectangular cross-section), a plurality of key tracks 375 (generally curved cross-section), a first vent aperture 376, and a key member 378.

Figure 22:
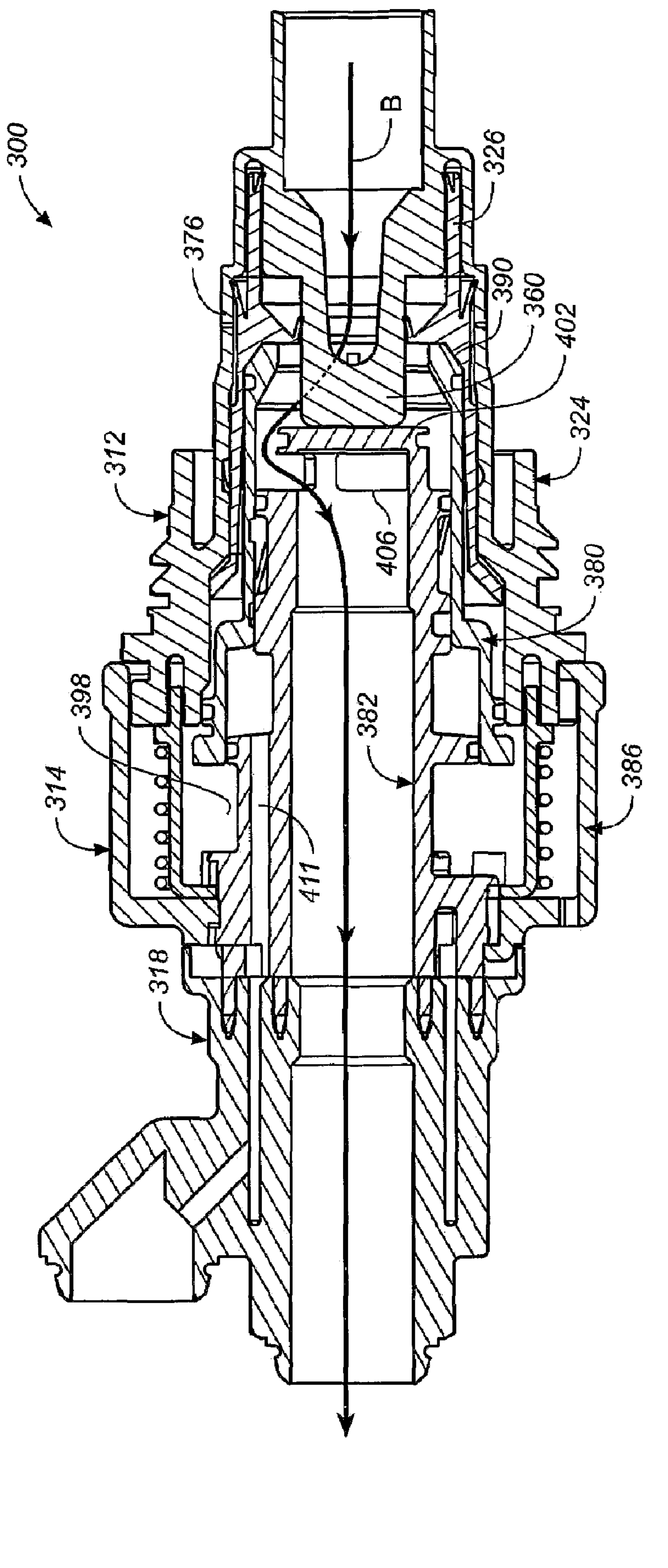
FIG. 22 is a cross-sectional plan view of the coupling assembly shown in FIG. 16 with the container insert, dispense unit and adapter manifold coupled together with the valves in opened positions.

Fluid flowing through the container insert 312 primarily contacts the first and second bores 330, 332 of the insert sleeve 322 and the third bore section 358 of the base 324 (see the fluid flow path in FIG. 22). The contact portion 334 is configured to engage an end of the coupling sleeve of the dispense unit 314 as described further below. The lip seals 336, 338, 340 provide a sealing connection between the insert sleeve 322 and the base 324 and may be replaced with other sealing structures in other embodiments such as, for example, O-rings. The track followers 342 are formed on an outer surface of the insert sleeve 322 and are configured to engage the helical key tracks 375. The vent tracks 374 provide a vent path between the bore section 354 and the vent aperture 376. A difference in cross-sectional shape between the venting tracks 374 and the key tracks 375 may be useful to ensure that the track followers 342 engage the correct tracks (key tracks 375). Venting a fluid such as air between the sleeve insert 322 and the base 324 is discussed in further detail below.

The first key cutouts 344 are formed on an inner surface of the second bore 332 of the insert sleeve 322 and are sized to receive key members of a coupling sleeve (described further below) of the dispense unit 314, thereby requiring the insert sleeve 322 to rotate with the coupling sleeve when the coupling assembly 300 is assembled. The second key cutout 346 is formed at the end 328 of the insert sleeve 322 and is sized to engage the key member 378 formed in the first bore section 354 of the base 324. The second key cutout 346 assists in properly aligning the insert sleeve 322 within the base 324 and may be sized to limit the amount of rotation of the sleeve insert 322 relative to the base 324.

The valve protrusion 360 of the base 324 includes a valve contact surface 361 configured to engage an end of a stem poppet 382 (described below) of the dispense unit 314, and also includes a plurality of openings 362 that provide fluid communication between the second and third bore sections 356, 358. The threads 367 of the container engagement surface 366 are sized to engage threads in the opening of a container to which the coupling assembly 300 is secured. Other embodiments may include different connection features other than threads for providing a positive attachment of the container insert 312 to a container. The sealing member seat 368 is sized to retain a sealing number (not shown) that provides an airtight seal between the outer surface of the base 324 and the container. The coupling ring seat 370 is sized to receive an attachment feature of the coupling ring of the dispense unit, and the collar seat 372 is configured to engage features of the collar of the dispense unit 314.

Figure 23:
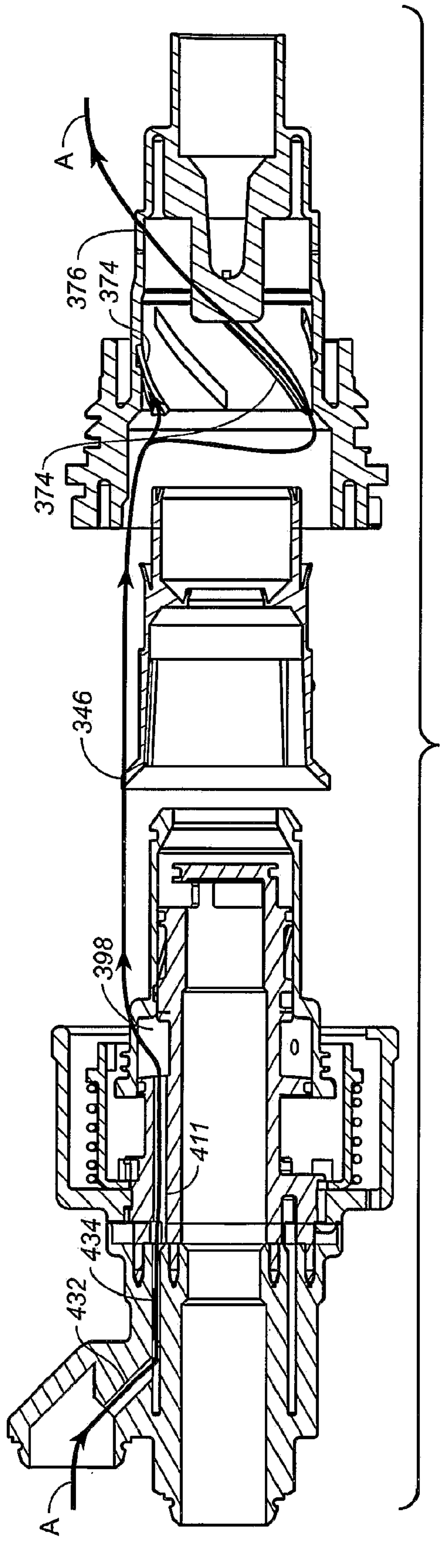
FIG. 23 is an exploded cross-sectional plan view of the coupling assembly shown in FIG. 16 with the vent path illustrated with flow lines.

The first vent aperture 376 is formed in an outer wall of the base 324 and provides fluid communication between an outer surface of the container insert 312 and the second bore section 356, which bore is vented with the helical vent tracks 374 as described above. Example fluid flow through first vent aperture 376 is illustrated in FIG. 23 as flow line B.

Figure 21:
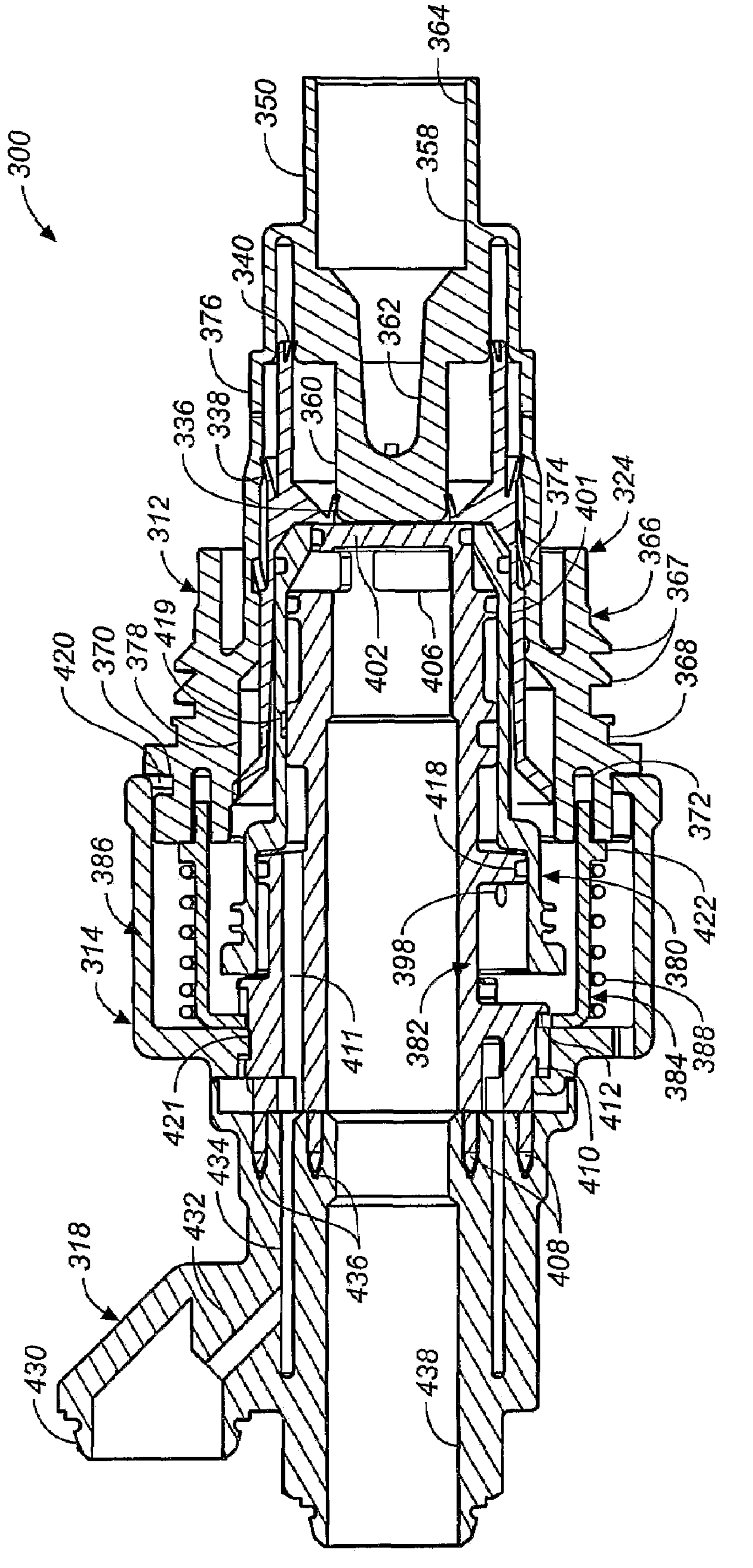
FIG. 21 is a cross-sectional plan view of the coupling assembly shown in FIG. 16 with the container insert, dispense unit and adapter manifold in the initial mating position and the valves in closed positions.

Referring now to FIGS. 18 and 20-23, the dispense unit 314 includes a coupling sleeve 380, a stem poppet 382, a collar 384, a coupling ring 386, and a spring 388. Coupling sleeve 380 includes first and second ends 390, 392, a bore 393, first and second sealing member grooves 394, 396, a vent aperture 398 extending to an outer wall thereof, and helical tracks 400 formed on the inner diameter surface of the bore 393. The first end 390 is configured to engage the insert sleeve 322 of the container insert 312 as shown in FIGS. 21 and 22. A sealing member (not shown) positioned in the first sealing member groove 394 provides an airtight seal between the coupling sleeve 380 and the base 324 of the dispense unit 314 when the valves of the coupling assembly 300 are open, as shown in FIG. 22. A sealing member (not shown) positioned in the second sealing member groove 396 provides a seal between the first end 390 and the insert sleeve 322 of the container insert 312. The vent aperture 398 provides a vent path for venting the inner volume of the container, which will be described in further detail below.

The helical track 400 is sized to receive a key member of the stem poppet 382. The coupling sleeve 380 may also include key members 401 that are formed in an outer surface thereof and sized to engage the key cutouts 344 in the insert sleeve 322. Engagement of the key member 401 in the key cutouts 344 provides a connection between the coupling sleeve 380 and the insert sleeve 322 such that the sleeves 380, 322 rotate together when the coupling assembly 300 is assembled.

The stem poppet 382 includes first and second ends 402, 404, flow openings 406, an adapter manifold engagement member 408, a coupling ring engagement surface 410, a vent path 411, a collar engagement surface 412, and first, second and third sealing member grooves 414, 416, 418. The flow openings 406 provide fluid communication between an inner bore 403 of the stem poppet 382 and the inner bores 330, 332 of the insert sleeve 322. The flow openings 406 are sealed relative to the coupling sleeve 380 with sealing members (not shown) retained in the first and second sealing member grooves 414, 416.

The vent path 411 provides a venting path between the venting features of the adapter manifold 318 and the vent aperture 398 formed in the coupling sleeve 380 when the valves are in the open position (see FIG. 22). The function of vent path 411 will be described in further detail below.

The coupling ring engagement surface 410 is configured to engage the coupling ring 386 and the collar engagement surface 412 is configured to engage the collar 384 as shown in FIG. 21. The third sealing member groove 418 is configured to retain a sealing member (not shown) to form a seal between the stem poppet 382 and the coupling sleeve 380. Stem poppet 382 may also include a key member 419 formed on an outer surface thereof that is sized to engage the helical tracks 400 of the coupling sleeve 380.

The adapter manifold engagement structure 408 is configured to engage connection features of the adapter manifold 318 for coupling the adapter manifold 318 to the dispense unit 314. Other embodiments may include different connecting structures such as snap fit, weld, and latch connectors.

The collar 384 includes a spring seat 422 configured to retain the spring 388 (see FIG. 21) between the coupling ring 386 and the collar 384. The coupling ring 386 includes a container insert engagement structure 420 that is configured to engage the coupling ring seat 370 formed in a second end 352 of the base 324. The structure of the coupling ring seat 370 may be used to control the amount of rotation of the coupling ring 386 relative to the base 324. A poppet stem connection structure 421 provides a positive attachment between the coupling ring 386 and the stem poppet 382 such that rotation of the coupling ring 386 causes rotation of the stem poppet 382 whether or not the collar 384 is fixed to the stem poppet 382.

The adapter manifold 318 includes a vent connector 430, first and second vent paths 432, 434, a primary fluid path 438, and a poppet connection structure 436. The vent connector 430 is configured as a generic weld joint that may be coupled to any desired venting source, such as, for example, atmospheric air or a source of gas such as, $N_2$ or other inert gas. The vent paths 432, 434 provide fluid communication with the vent paths 411 formed in the stem poppet 382. The second vent path 434 may be a cylindrical channel surrounding the primary fluid path 438 such that connection of the adapter manifold 318 to the dispense unit 314 provides venting communication with the vent path 411 at any rotated position of the adapter manifold 318 relative to the dispense unit 314. The poppet connection structure 436 may provide a positive attachment with a snap fit, weld, latch or other locking feature, or may be, for example, a mere interference fit connection with the stem poppet 382. The adapter manifold 318 may have a variety of different configurations providing for a source of replacement or venting gases or may be configured with a simple vent port to atmospheric air. The adapter manifold 318 may include any suitable connection with the primary fluid path 438 when removing the container contents through the coupling assembly 300.

Preferably, the adapter manifold 318 is coupled to the dispense unit 314 to ensure a proper connection prior to the dispense unit 314 being coupled to the container insert 312 so that the coupling assembly 300 is ready for dispensing the container contents as soon as the dispense unit 314 is coupled to the container insert 312. The container insert 312 is inserted into a container (not shown) with the threads 367 of the engagement surface 366 engaging threads or other connecting structures of the container. Coupling the container insert 312 to the container also draw a sealing member (not shown) positioned in the sealing member seat 368 against a top surface of the container thereby providing an airtight seal between the container insert 312 and the container.

With the container insert 312 secured to the container, the dispense unit 314 is brought into engagement with the container insert. Coupling of the container insert 312 and dispense unit 314 begins with alignment of the key members 401 of the coupling sleeve 380 with the first key cutouts 344 of the insert sleeve 322. With the key features 401, 344 engaged, the dispense unit 314 is further inserted into the container insert

312 until the first end 402 of the stem poppet 382 and the first end 390 of the coupling sleeve 380 are brought into contact with the contact portion 334 and the valve protrusion 360, respectively, of the container insert 312. The container insert engagement structure 420 of the coupling ring 386 is concurrently coupled with a first track portion 369 of the seat 370 (see FIG. 17). With the engagement structure 420 positioned in the first track 369, the coupling ring 386 can be rotated relative to the base 324 to create a positive attachment between the container insert 312 and the dispense unit 314 while concurrently opening the valves of the coupling assembly 300 to provide a fluid flow through the coupling assembly 300.

When the coupling assembly 300 is assembled, rotation of the coupling ring 386 causes rotation of the stem poppet 382 because of the positive attachment of those features via the poppet stem connection structure 421 and the coupling ring engagement surface 410. Rotation of the stem poppet 382 causes the key member 419 to move in the helical tracks 400 of the coupling sleeve 380 thereby forcing the coupling sleeve 380 to move axially in a direction toward the valve protrusion 360. Because the coupling sleeve 380 is also coupled to the insert sleeve 322 via the key members 401 and the first key cutouts 344, the insert sleeve 322 rotates with the coupling sleeve 380. Contact between the first end 402 of the coupling sleeve 380 and the contact portion 334 of the insert sleeve 322 forces the insert sleeve 322 to move axially relative to the valve protrusion 360 until the openings 362 are exposed to fluid communication with the flow openings 406 in the stem poppet 382 (see FIG. 22).

Reverse rotation of the coupling ring 386 will draw the insert sleeve 322 axially in a reverse axial direction because of the connection between the coupling ring 386 and the stem poppet 382, the connection between the stem poppet 382 and the coupling sleeve 380, and the connection between the coupling sleeve 380 and the insert sleeve 322. The combination of keys, key slots, helical tracks, and track followers of coupling assembly 300 provides for the opening and closing of the coupling assembly valves without the use of springs or other mechanical devices that may otherwise be required.

The coupling assembly 300 also provides for a quick connect/disconnect of the container insert 312 and dispense unit 314 with relative ease, and opening of the valve with a relatively simple rotation of the coupling ring 386 when the container insert 312 and dispense unit 314 are engaged with each other. The coupling assembly 300 further provides for a sealed container at all times until after the container insert 312 and dispense unit 314 are sealed together and the valves are opened, thus eliminating or at least significantly reducing the chances of the user being exposed to the container contents.

The coupling assembly 300 also substantially eliminates any dripping of the container contents from the dispense unit 314 or container insert 312 when removing the dispense unit from the container insert 312 because of the many different seals used in the coupling assembly 300 and the interface of various components of the dispense unit and container insert. Closing of the coupler assembly valves substantially captures any container contents behind a sealing member within an enclosed space of either the dispense unit 314 or the container insert 312 thereby preventing dripping container contents.

Coupling assembly 300 also provides for venting of the container during removal of the container contents. FIG. 23 illustrates a venting flow path A through the first and second vent paths 432, 434 of the adapter manifold 318, the vent path 411 of the stem poppet 382, the vent aperture 398 of the coupling sleeve 380, the key cutout 346 of the insert sleeve 322, the helical vent tracks 374, and the first vent aperture 376 of the base 324. As illustrated by a comparison between FIGS. 21 and 22, the vent path A shown in FIG. 23 is open only when the valves of the coupling assembly 300 are fully open for fluid communication of container contents through the coupling assembly 300.

Referring first to FIG. 21, the vent aperture 398 is positioned on a side of the third sealing member groove 418 (with its associated sealing member that is not shown) when the coupling assembly valves are in a closed position such that the vent aperture 398 is not in fluid communication with the vent path 411. However, as shown in FIG. 22, the vent aperture 398 is in fluid communication with the vent path 411 when the valves are in the open position. Again referring to FIG. 21, the vent path A is further obstructed when the valves of the coupling assembly are closed because the vent aperture 376 is sealed from the remaining vent path by the second lip seal 338. However, referring to FIG. 22, the vent aperture 376 becomes exposed to complete the vent path A when the insert sleeve 322 and associated second lip seal 338 have moved axially into an open valve position.

As a result of the coupling assembly 300 venting configuration, venting is not open until after the valves of the coupling assembly are open. As the container contents are drawn out of the container via the fluid flow path B (see FIG. 22), air or other gases can be drawn or forced into the container via the vent path A. Some venting configurations may allow for a positive pressure to be applied along the venting path A, thereby creating a positive pressure within the container rather than a typical negative pressure condition that exists when removing container contents through the coupling assembly. Other embodiments may also include a one-way valve positioned along the vent flow path A that permits fluids to flow only into the container and not back out of the container along the flow path A.

Figure 26:
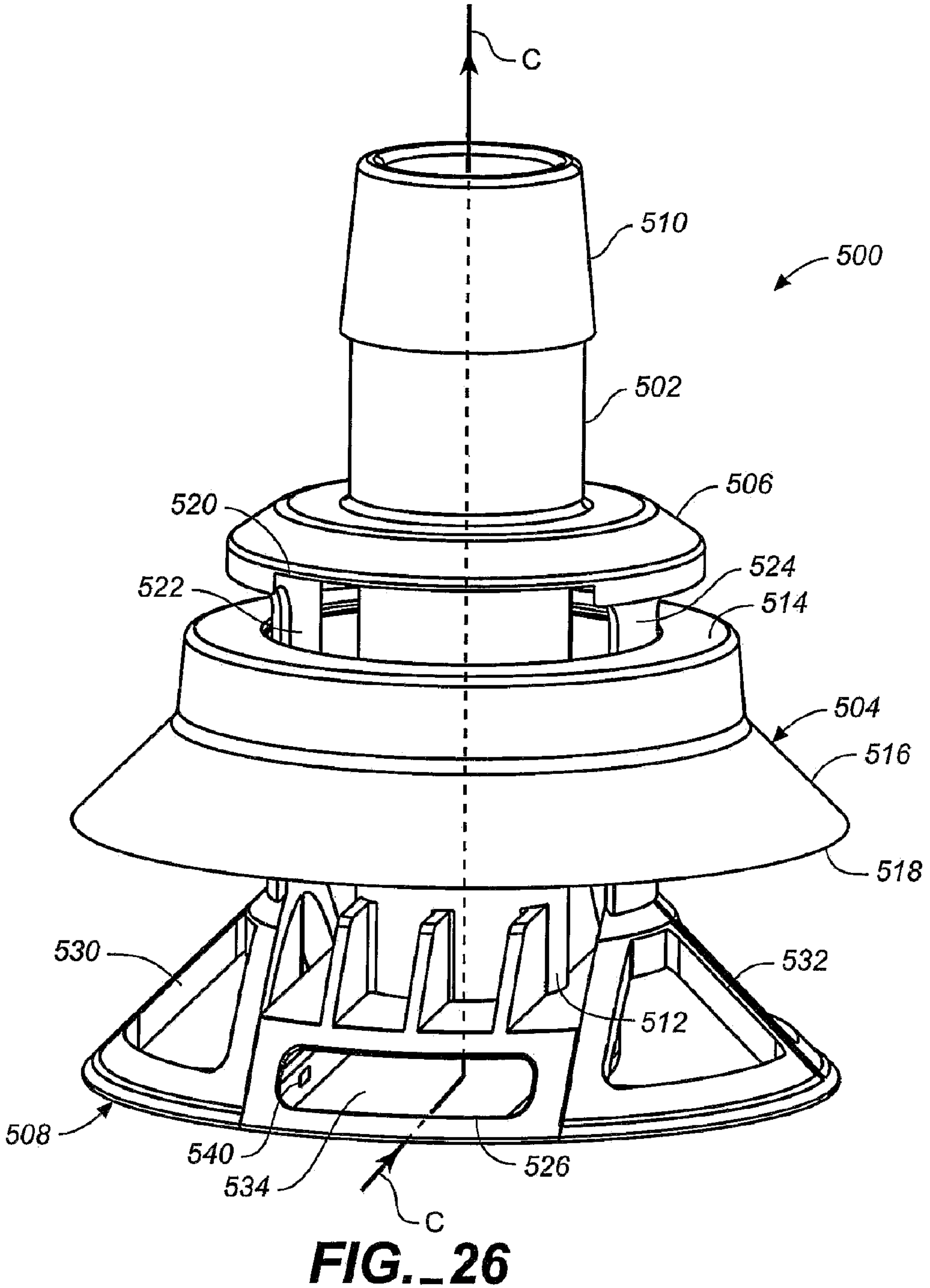
FIG. 26 is a perspective view of an example dip tube check valve.
Figure 27:
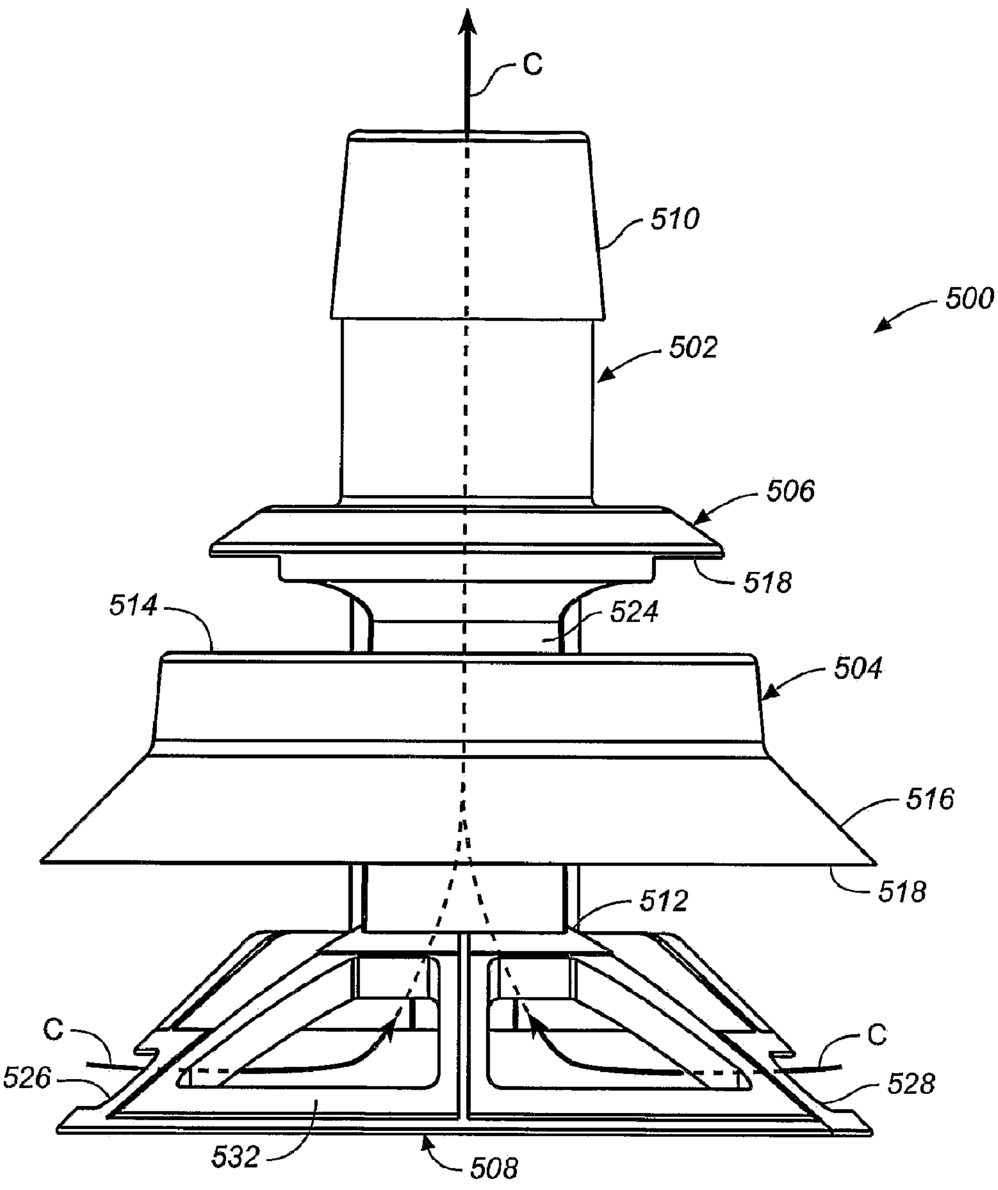
FIG. 27 is a side view of the check valve shown in FIG. 26.
Figure 28:
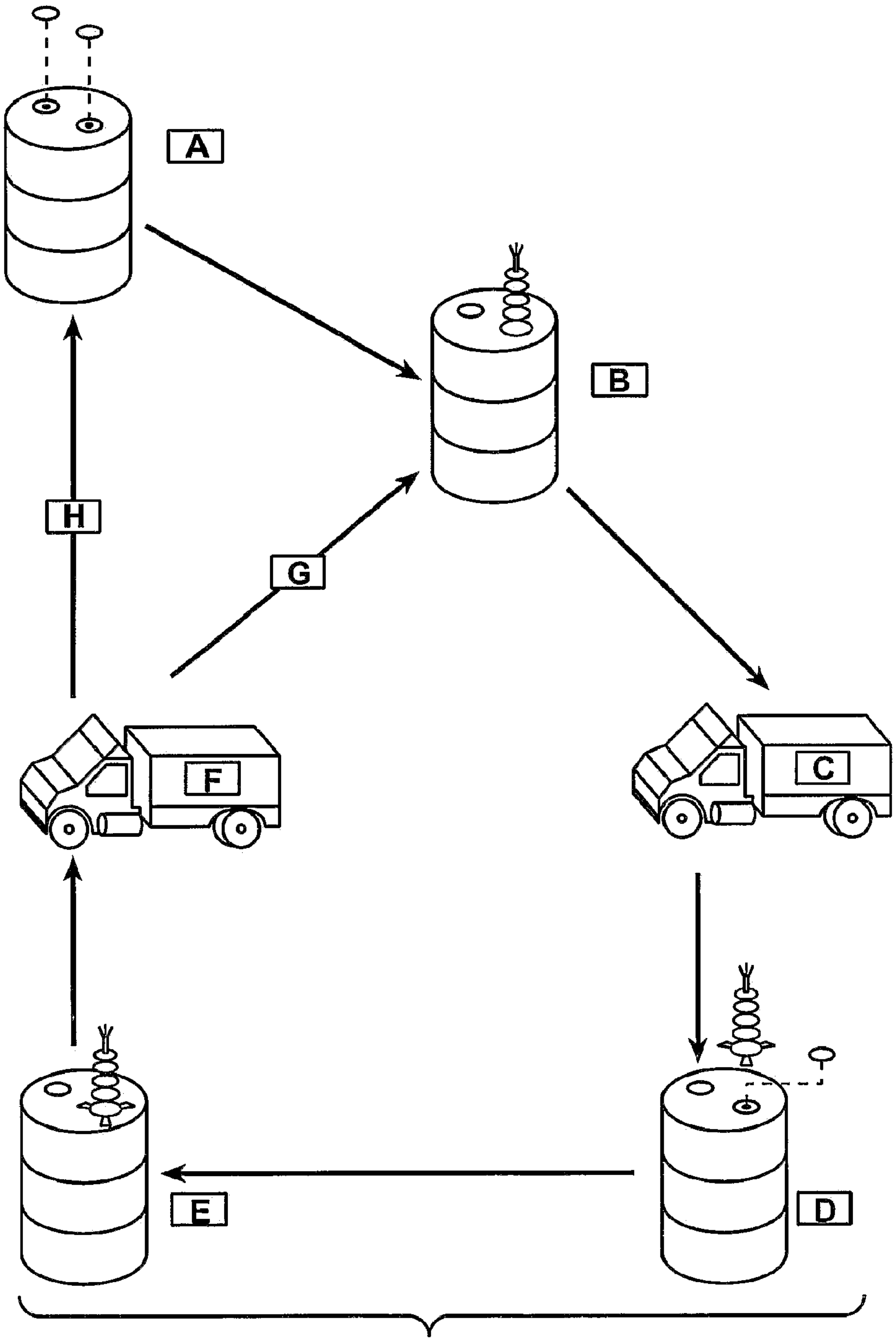
FIG. 28 is a schematic flow chart showing an example container life cycle.

The coupling assemblies 10, 300 may benefit from use with the dip tube check valve assembly 500 shown in FIGS. 26 and 27. The check valve assembly 500 may be coupled to an end of a dip tube, such as dip tube 16 shown in FIG. 4, that is inserted into and positioned at a bottom of a container (not shown). The check valve assembly 500 may provide an additional valve function in association with the valves of coupling assemblies 10, 300 to maintain a barrier between the container contents (and associated fumes in the container) and a user operating the coupling assemblies 10, 300. The check valve assembly 500 may be useful for at least partially sealing closed a relatively empty container to which the container insert 12 is coupled when the dispense unit 14 is removed and a shipping cap has not yet be coupled to the container insert 12. The check valve assembly 500 may also be particularly useful for sensing when the container is nearly empty of its contents and signaling the pumping unit to turn off so that the dispense line and pump are not filled with air. A dispense line filled with air often requires priming before the dispense unit can be used again.

Check valve assembly 500 includes a tube portion 502, a valve member 504, a valve support member 506, and a base 508. The tube portion includes a dip tube connector end 510 that is configured for coupling to either an inner or outer diameter surface of a dip tube, and an open end 512. The valve member 504 includes a top surface 514, a sealing surface 516, and a bottom edge 518. The valve support member 506 includes a top stop member 520, and first and second valve supports 522, 524. The base 508 includes first and second flow openings 526, 528, first and second base supports 530, 532, and a floor member 534. The flow openings 526, 528 are in fluid communication with the open end 512 of the tube 502 and provide a fluid flow path C from the container into the tube 502 and into a dip tube (not shown).

The check valve assembly 500 functions to seal off flow into a dip tube to which the assembly 500 is coupled by contacting the sealing surface 516 of the valve member 504 against the base 508 around the openings 526, 528. The valve member 504 can be lowered into a position where the sealing surface 516 contacts the base 508 only when a level of container contents in the container drops to a level that allows the otherwise floating valve member 504 to drop into close proximity to the openings 526, 528. When the valve member 504 gets close to the openings 526, 528, suction forces that are drawing the container contents out of the container through the openings 526, 528 pull the sealing surface 516 of the valve member 504 against the base 508 around the openings 526, 528, thereby sealing the check valve assembly 500 in a closed condition. When a level of the container contents is relatively high, the valve member 504 floats upward while supported by the valve supports 522, 524 until the top edge 514 engages the top stop 520. As the level of the container contents drops, the valve member 504 also drops toward the base 508 until drawn into sealing engagement with the base 508 under suction forces as described above.

In another embodiment, the valve member 504 does not seal against the base 508 as the container contents drop below the top stop 520. However, as the valve member 504 lowers, the flow path into openings 526, 528 becomes obstructed by the valve member 504, thereby altering the pressure within the dispense line out of the container. This change of pressure can be identified by a sensor or other device that then signals the dispense pump to shut off before air enters the dispense line and pump.

Other check valve embodiments may include features having different shapes and sizes than those shown in FIGS. 26 and 27. For example, the base and valve member may have a rectangular shape and the base may include one, three, or more openings into the tube portion of the check valve assembly. Other embodiments may include a valve member that can drop below the base of the check valve assembly to contact and seal against a floor of the container in place of or in addition to sealing against the base around the openings of the base.

The check valve assembly features may be made from any suitable material that is resistant to corrosion, relatively cost effective to manufacture, and performs the check valve functions as desired. One example valve member includes silicon rubber for enhanced pliability and sealing functionality, and the remaining check valve features include a polymer material such as polyethylene.

The check valve assembly 500 may further include a sensor 540 that monitors features of the check valve assembly 500 and provides a signal when a predetermined condition is met. In one embodiment, the sensor 540 monitors the fluid flow through check valve openings 526, 528 and generates a flow signal when fluid flow reaches a certain low level (e.g., when fluid flow stops). In another embodiment, the sensor 540 monitors a position of the valve member 504 relative to the base 508, in particular one of the openings 526, 528, and generates a position signal when a predetermined distance is reached. The flow and position signals may be representative of, for example, the level of container contents, the rate of fluid flow, the amount of time remaining until the container is "empty", etc. The sensor 540 may include multiple sensors or may include other additional components as needed to conduct the desired monitoring and measuring.

The signals produced by the sensor 540 may be collected, processed and distributed by a controller positioned at a remote location outside of the container in which the check valve 500 resides. The signal may also be sent directly to a dispense unit, pump, or other device that is coupled to an opposing end of the dip tube to which the check valve 500 is coupled and is used to remove the container contents. The signals produced by the sensor 540 may be used to shut down or modify the dispense unit, pump, or other device when the sensor signals indicate a predetermined condition exists in the container.

Figure 24:
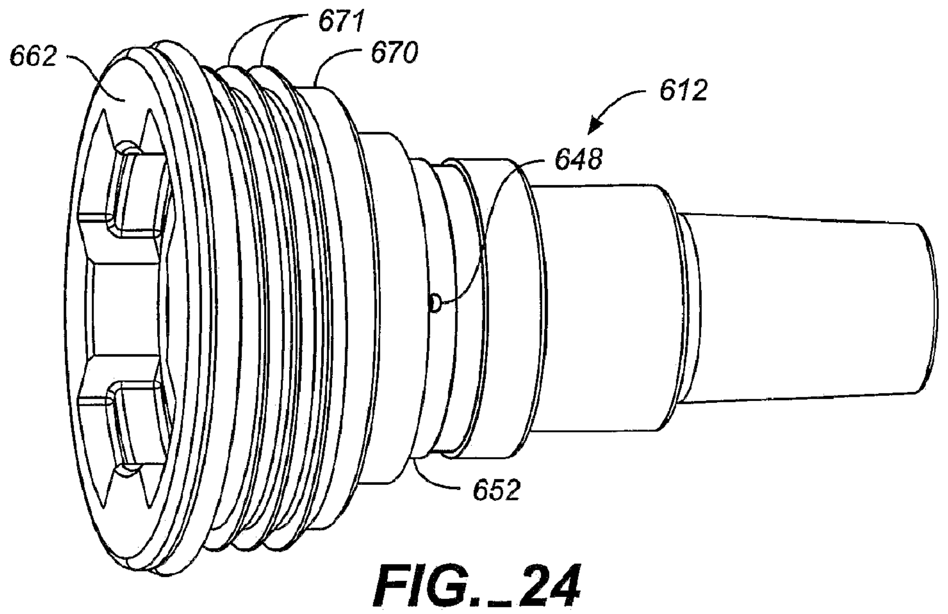
FIG. 24 is a perspective view of an example single-piece container insert according to principles of the present invention.
Figure 25:
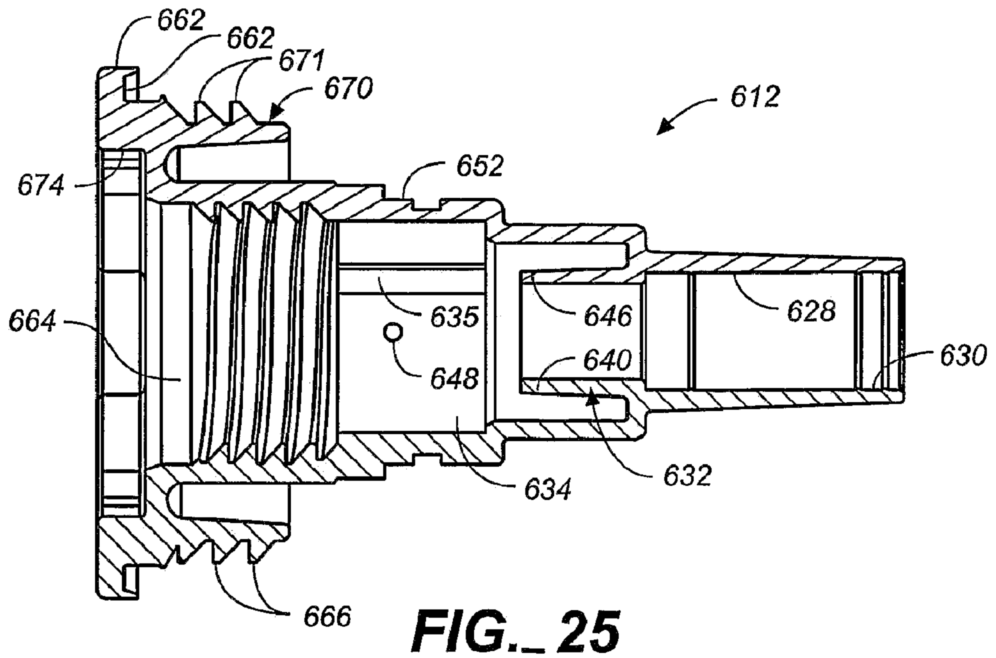
FIG. 25 is a cross-sectional view of the container insert shown in FIG. 24.

Referring now to FIGS. 24 and 25, an example single piece container insert 612 is shown including an open cavity 628 that defines a flow path, a dip tube engagement surface 630, a valve engagement member 632, a keyed surface 634 having a key member 635, and a check valve seat 652. The valve engagement member 632 may include a wall structure 640 and a slot 646 in the wall 40. The check valve seat 652 includes a vent aperture 648 and is sized to receive a sealing member (not shown) such as an O-ring, lip seal, or umbrella seal.

The container insert 600 also includes an open cavity 664 having a plurality of threads 666 formed therein, and a container engagement portion 670 having a plurality of threads 671, a sealing member groove 672, and an actuator seat 674.

A single piece container insert 612 may have some advantages over the two piece container insert 12 described above. For example, a single piece device may be more robust than a two piece device because there is no chance of multiple pieces detaching from each other during use. Also, a two piece device requires assembly of the pieces while a single piece device requires no assembly. One potential disadvantage of a single piece device relates to manufacturing the device with the number of features both inside and out of the container insert. Forming these many features in two separate pieces may reduce the manufacturing complexity as compared to a single piece manufacturing process.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A coupling assembly for removing the contents of a container from an opening in the container, the coupling assembly comprising:

- a container insert coupled to the container opening and including:
  - a first open cavity extending through the container insert;
  - a first keyed surface formed in a surface of the cavity;
  - a first engagement surface formed in a surface of the cavity; and
- a dispense unit including:
  - a first dispense member having a second open cavity extending there through and a second engagement surface formed on an outer surface thereof, the second engagement surface being configured to engage the first engagement surface to releasably couple the dispense unit to the container insert;
  - a second dispense member having a third open cavity extending there through, the second dispense member being at least partially disposed within the second open cavity and being adjustably coupled to the first dispense member;
  - a valve assembly positioned in the third open cavity; and
  - a second keyed surface configured to mate with the first keyed surface prior to engagement of the first and second engagement surfaces when the dispense unit is brought into contact with the container insert.

2. The assembly of claim 1, wherein the second keyed surface is removably coupled to the second dispense member.

3. The assembly of claim 2, wherein the second keyed surface in part retains the second dispense member within the first dispense member.

4. The assembly of claim 1, wherein the first dispense member further includes a first recess area extending coaxial with the second open cavity from a first end toward a second end of the first dispense member, the first recess area defining a valve seat configured to engage a portion of the valve assembly after engagement of the first and second engagement surfaces when the dispense unit is brought into contact with the container insert the dispense unit is brought into engagement thereby opening the valve assembly.

5. The assembly of claim 1, wherein the container insert includes a top insert member and a bottom insert member, the top insert member being configured to adjustably engage the container at the container opening, and the bottom insert member including the first keyed surface.

6. The assembly of claim 1, wherein the container insert is mounted flush with an exterior surface of the container.

7. The assembly of claim 1, wherein the container insert comprises a moldable plastic.

8. The assembly of claim 1, wherein the container insert is configured for a useful life of five or less uses.

9. The assembly of claim 2, wherein the second keyed surface is coupled to the second dispense member with a snap-fit or welded connection.

10. The assembly of claim 2, wherein the second keyed surface is coupled to the second dispense member with an interference fit that permits resistive rotation of the second keyed surface relative to the second dispense member.

11. The assembly of claim 1, wherein the container insert includes a valve assembly, wherein the container insert valve assembly and the dispense unit valve assembly are adjustable from a closed position into an open position after engagement of the first and second engagement surfaces when the dispense unit is brought into contact with the container insert.

12. The assembly of claim 1, wherein the dispense unit includes at least one lip seal configured to engage a surface of the first open cavity to form a seal there between.

13. The assembly of claim 1, further comprising a venting assembly configured to provide a source of fluid into the container upon removal of the container contents through the coupling assembly.

14. The assembly of claim 1, further comprising a reader device coupled to the dispense unit and configured to identify and record information related to the container.

15. The assembly of claim 14, further comprising an information storage device coupled to the container insert and configured to store information related to the container.

16. A coupling assembly for removing the contents of a container from an opening in the container, the coupling assembly comprising:

a container insert coupled to the container opening and including:

a first open cavity extending through the container insert and including at least first and second contact surfaces; and a dispense unit including:

a first dispense member having a second open cavity extending there through and a third contact surface formed on an outer portion thereof, the third contact surface being configured to engage the first contact surface to releasably couple the dispense unit to the container insert;

a second dispense member having a third open cavity extending there through and a fourth contact surface formed on an outer portion thereof, the second dispense member being at least partially disposed within the second open cavity and being adjustably coupled to the first dispense member; and a third dispense member having a fifth contact surface on an outer portion thereof and a sixth contact surface on an inner surface thereof, the fifth contact surface being configured to engage the second contact surface, and the sixth contact surface being configured to engage the fourth contact surface in an interference fit connection;

whereby the interference fit connection provides cooperative movement of the second and third dispense members to ensure engagement between the second and fifth contact surfaces, while providing relative rotational movement between the second and third dispense member during engagement of the first and third contact surfaces.

17. The assembly of claim 16, wherein the first contact surface includes a first keyed surface and the third contact surface includes a second keyed surface configured to mate with the first keyed surface.

18. The assembly of claim 16, wherein the second contact surface is a female threaded structure and the fourth contact surface is a threaded male structure configured to mate with the female threaded structure to create positive attachment of the container insert to the dispenser unit.

* * * * *